United States Patent
Ode

(10) Patent No.: US 10,555,298 B2
(45) Date of Patent: Feb. 4, 2020

(54) WIRELESS COMMUNICATION SYSTEM, BASE STATION, AND TERMINAL

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/284,235

(22) Filed: Oct. 3, 2016

(65) Prior Publication Data
US 2017/0026965 A1 Jan. 26, 2017

Related U.S. Application Data

(63) Continuation of application No. PCT/JP2014/060547, filed on Apr. 11, 2014.

(51) Int. Cl.
*H04W 52/18* (2009.01)
*H04W 48/12* (2009.01)
(Continued)

(52) U.S. Cl.
CPC ...... *H04W 72/0446* (2013.01); *H04B 17/309* (2015.01); *H04W 24/02* (2013.01); *H04W 48/10* (2013.01); *H04W 48/18* (2013.01); *H04W 52/18* (2013.01); *H04W 16/32* (2013.01); *H04W 48/12* (2013.01); *H04W 88/06* (2013.01)

(58) Field of Classification Search
CPC .... H04B 17/309; H04W 24/02; H04W 48/10; H04W 52/34; H04W 52/343; H04W 72/04; H04W 52/18
See application file for complete search history.

(56) References Cited

U.S. PATENT DOCUMENTS 5,546,443 A 8/1996 Raith
6,992,993 B1 1/2006 Park et al.
(Continued)

FOREIGN PATENT DOCUMENTS

JP H07-509826 A 10/1995
JP 2007-535205 A 11/2007
(Continued)

OTHER PUBLICATIONS

International Search Report of related International Patent Application No. PCT/JP2014/060547 dated Jun. 3, 2014.
(Continued)

*Primary Examiner* — Raj Jain
(74) *Attorney, Agent, or Firm* — Arent Fox LLP

(57) ABSTRACT

A wireless communication system includes a terminal configured to perform wireless communication concurrently using a cell of a first type enabling connection without being associated with another cell and a cell of a second type enabling connection by being associated with the cell of the first type; and a base station configured to form a first cell and transmit broadcast information through the first cell, the broadcast information including identification information of a second cell of the first type different from the first cell and giving notification that the second cell is a cell of the first type. The terminal selects the second cell as the cell of the first type based on the broadcast information transmitted by the base station.

13 Claims, 24 Drawing Sheets

(51) Int. Cl.
*H04W 48/10* (2009.01)
*H04W 24/02* (2009.01)
*H04W 72/04* (2009.01)
*H04W 48/18* (2009.01)
*H04B 17/309* (2015.01)
*H04W 16/32* (2009.01)
*H04W 88/06* (2009.01)

(56) References Cited

U.S. PATENT DOCUMENTS

| | | | |
|---|---|---|---|
| 8,724,550 | B2 | 5/2014 | Kone |
| 8,942,745 | B2 | 1/2015 | Centonza et al. |
| 9,106,380 | B2 | 8/2015 | Baldemair et al. |
| 9,730,097 | B2 | 8/2017 | Yu et al. |
| 9,801,144 | B2 * | 10/2017 | Luo ............... H04W 52/343 |
| 2008/0108353 | A1 | 5/2008 | Lee et al. |
| 2008/0220784 | A1 | 9/2008 | Somasundaram et al. |
| 2009/0042572 | A1 | 2/2009 | Craig et al. |
| 2009/0274086 | A1 | 11/2009 | Petrovic et al. |
| 2010/0022250 | A1 | 1/2010 | Petrovic et al. |
| 2010/0216469 | A1 | 8/2010 | Yi et al. |
| 2011/0201367 | A1 | 8/2011 | Aminaka et al. |
| 2012/0040696 | A1 | 2/2012 | Siomina et al. |
| 2012/0044910 | A1 | 2/2012 | Maeda et al. |
| 2012/0088516 | A1 | 4/2012 | Ji et al. |
| 2012/0094711 | A1 | 4/2012 | Lee et al. |
| 2012/0100854 | A1 | 4/2012 | Hanaoka |
| 2012/0113839 | A1 | 5/2012 | Etemad |
| 2012/0201226 | A1 | 8/2012 | Sambhwani et al. |
| 2012/0250578 | A1 | 10/2012 | Pani et al. |
| 2012/0281602 | A1 | 11/2012 | Tsunekawa |
| 2013/0022026 | A1 | 1/2013 | Ishii et al. |
| 2013/0107826 | A1 | 5/2013 | Dinan |
| 2013/0114472 | A1 | 5/2013 | Tamaki et al. |
| 2013/0114568 | A1 | 5/2013 | Sagae et al. |
| 2013/0130682 | A1 | 5/2013 | Awad et al. |
| 2013/0182583 | A1 | 7/2013 | Siomina et al. |
| 2013/0188473 | A1 | 7/2013 | Dinan |
| 2013/0258895 | A1 | 10/2013 | Kim et al. |
| 2013/0301565 | A1 | 11/2013 | Xu et al. |
| 2013/0303168 | A1 | 11/2013 | Aminzadeh Gohari et al. |
| 2013/0336296 | A1 | 12/2013 | Dinan |
| 2014/0029514 | A1 | 1/2014 | Yu et al. |
| 2014/0112300 | A1 | 4/2014 | Han et al. |
| 2014/0274095 | A1 | 9/2014 | Saito |
| 2014/0301301 | A1 | 10/2014 | Cheng et al. |
| 2014/0378126 | A1 | 12/2014 | Uchino et al. |
| 2015/0063148 | A1 | 3/2015 | Sadek |
| 2015/0092750 | A1 | 4/2015 | Huang et al. |
| 2015/0124743 | A1 | 5/2015 | Damnjanovic et al. |
| 2015/0146692 | A1 | 5/2015 | Yi et al. |
| 2015/0215926 | A1 | 7/2015 | Huang et al. |
| 2015/0223149 | A1 | 8/2015 | Liu et al. |
| 2015/0223212 | A1 | 8/2015 | Der Velde et al. |
| 2015/0312947 | A1 | 10/2015 | Park et al. |
| 2015/0319754 | A1 | 11/2015 | Ishida et al. |
| 2015/0319800 | A1 | 11/2015 | Park et al. |
| 2015/0373767 | A1 | 12/2015 | Park et al. |
| 2016/0081036 | A1 | 3/2016 | Luo et al. |
| 2017/0019802 | A1 | 1/2017 | Ode |
| 2018/0115430 | A1 | 4/2018 | Seo |

FOREIGN PATENT DOCUMENTS

| | | |
|---|---|---|
| JP | 2008-118404 A | 5/2008 |
| JP | 2008-543217 A | 11/2008 |
| JP | 2010-506446 A | 2/2010 |
| JP | 2010-521119 A | 6/2010 |
| JP | 2010-263449 A | 11/2010 |
| JP | 2011-515941 A | 5/2011 |
| JP | 2011-124732 A | 6/2011 |
| JP | 2012-005084 A | 1/2012 |
| JP | 2013-042259 A | 2/2013 |
| JP | 2013-078061 A | 4/2013 |
| JP | 2013-526155 A | 6/2013 |
| JP | 2013-162327 A | 8/2013 |
| JP | 2013-532913 A | 8/2013 |
| JP | 2013-183366 A | 9/2013 |
| WO | WO 2010/061503 A1 | 6/2010 |
| WO | WO 2010/125769 A1 | 11/2010 |
| WO | WO 2010/134202 A1 | 11/2010 |
| WO | WO 2011/087022 A1 | 7/2011 |
| WO | WO 2011/099634 A1 | 8/2011 |
| WO | WO 2013/140533 A | 9/2013 |
| WO | WO 2014/020903 A1 | 2/2014 |

OTHER PUBLICATIONS

Fujitsu, Consideration on efficient discovery of small cell, 3GPF TSG RAN WG1, Meeting #72bis, R1-131100, Chicago, US, URL:http://www.3gpp.org/ftp/tsg_ran/WG1_RL1/TSGR1_72b/Docs/R1-131100.zip, Apr. 15-19, 2013.

International Search Report of related International Patent Application No. PCT/JP2014/060035 dated Jul. 8, 2014.

Japanese Office Action of related Japanese Patent Application No. 2016-511304 dated Jul. 11, 2017.

International Search Report of related International Patent Application No. PCT/JP2014/060875 dated Jul. 15, 2014.

U.S. Office Action of related U.S. Appl. No. 15/287,275 dated Feb. 27, 2018.

U.S. Office Action of related U.S. Appl. No. 15/280,309 dated Jun. 1, 2018.

MediaTek Inc., Handover with Carrier Aggregation, 3GPP TSG-RAN WG2#70, R2-102808, Montreal, Canada. URL:http://www.3gpp.org/ftp/tsg_ran/WG2_RL2/TSGR2_70/Docs/R2-102808.zip; May 10-14, 2010.

U.S. Office Action of related U.S. Appl. No. 15/280,309, dated Jan. 8, 2019.

U.S. Office Action of related U.S. Appl. No. 15/280,309, dated May 16, 2019.

* cited by examiner

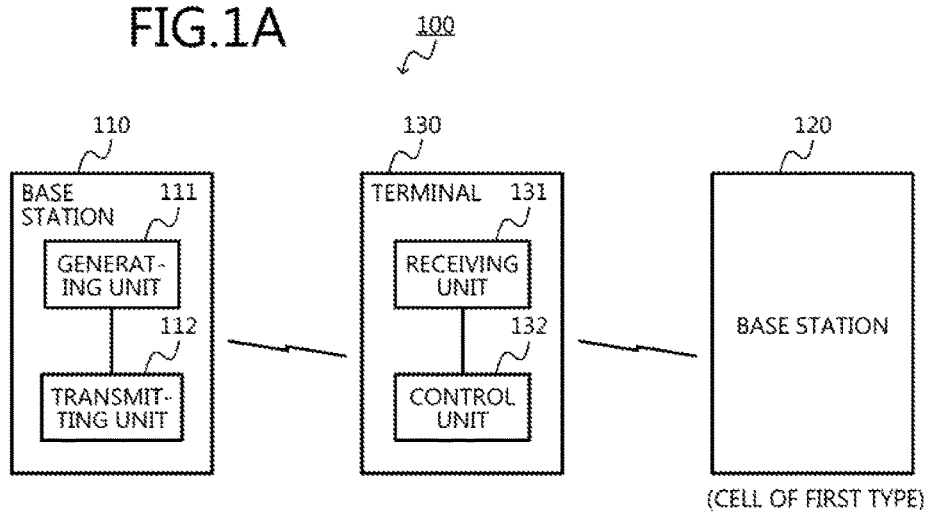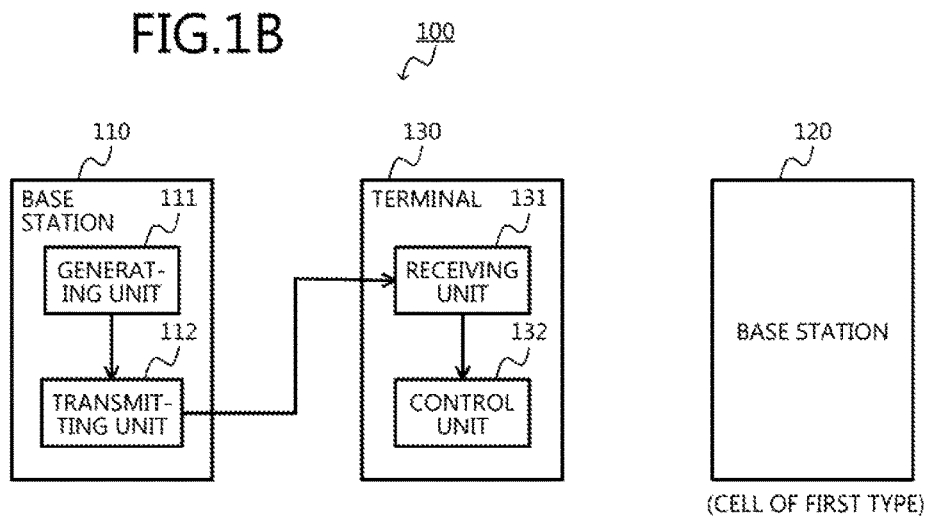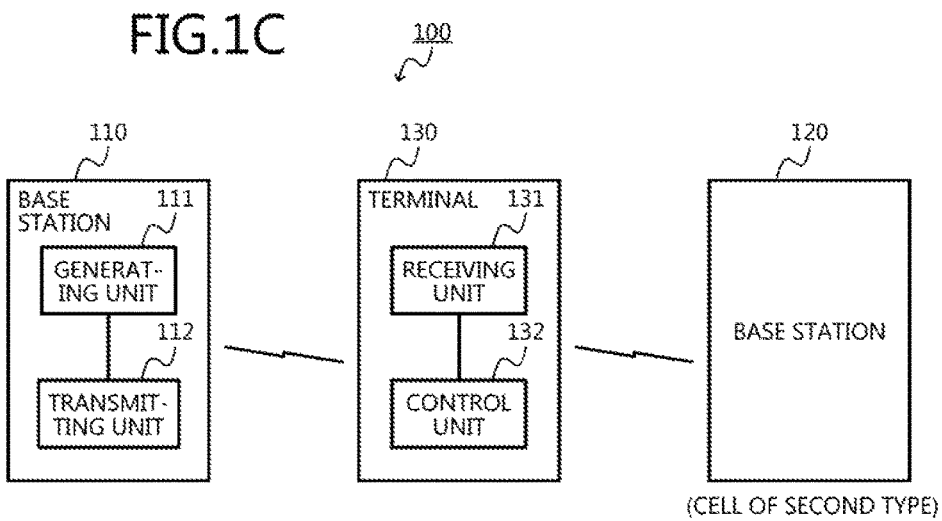

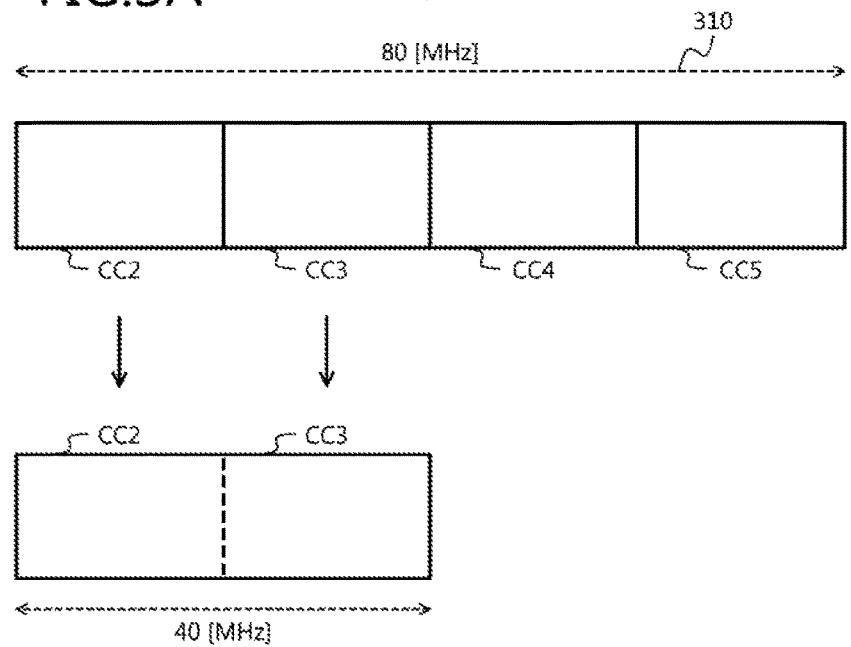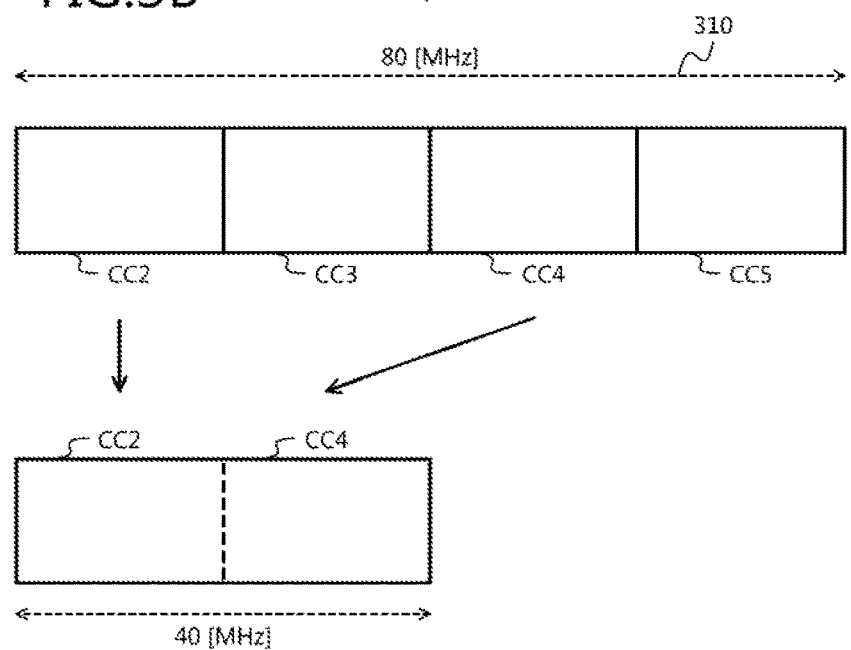

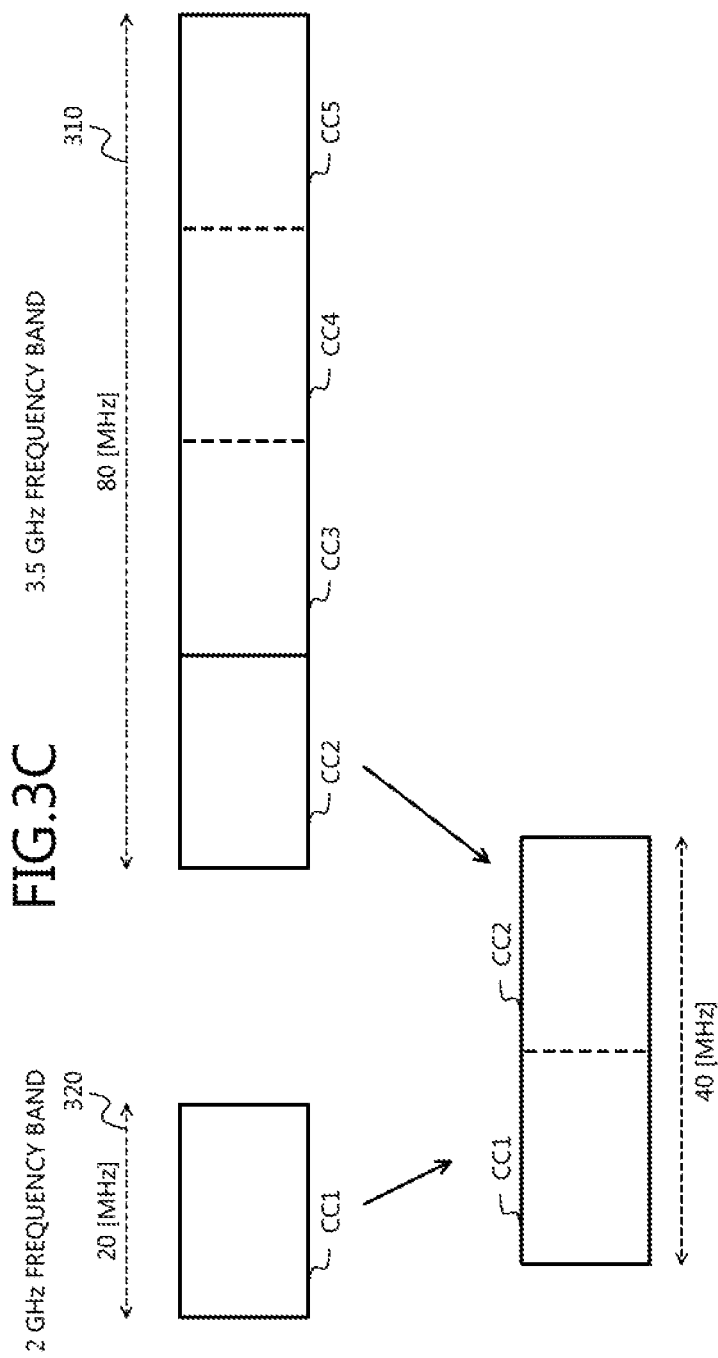

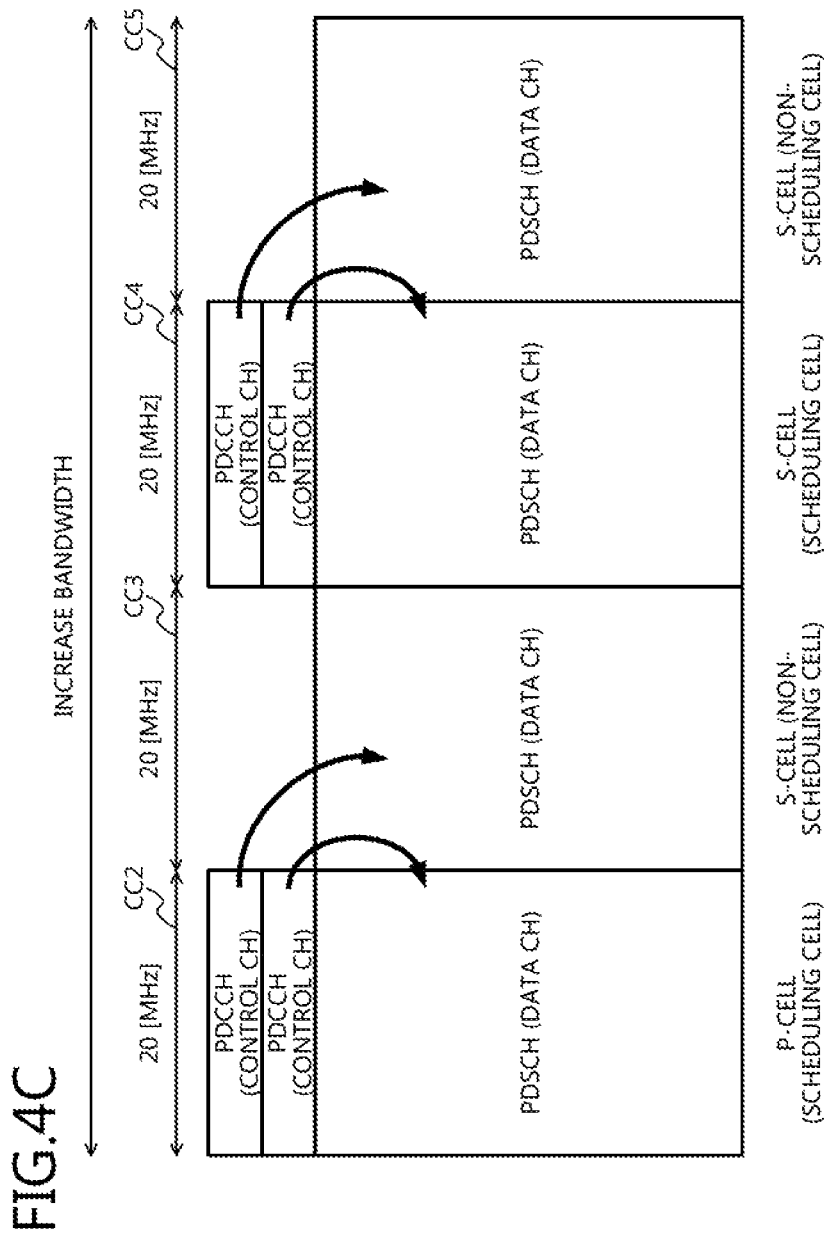

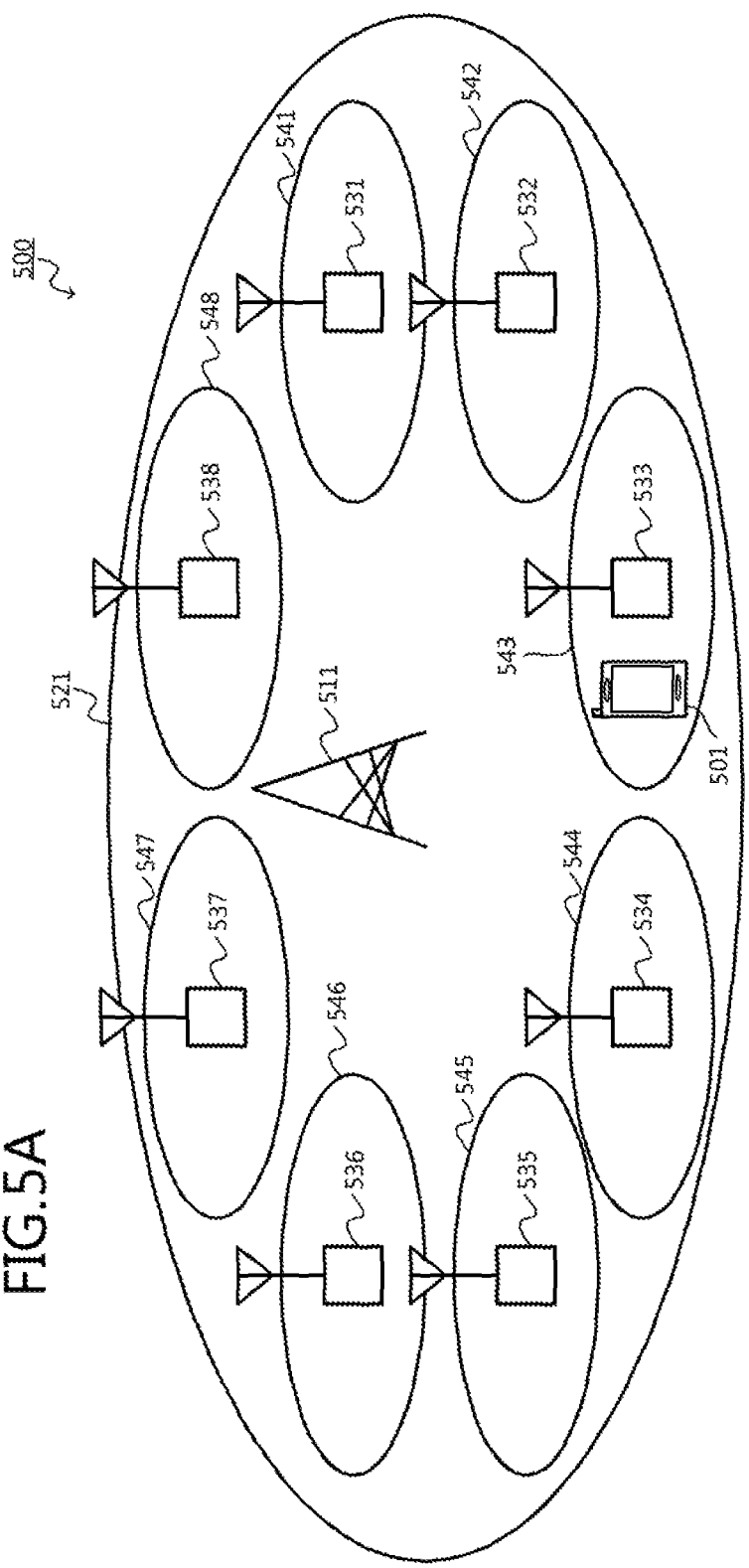

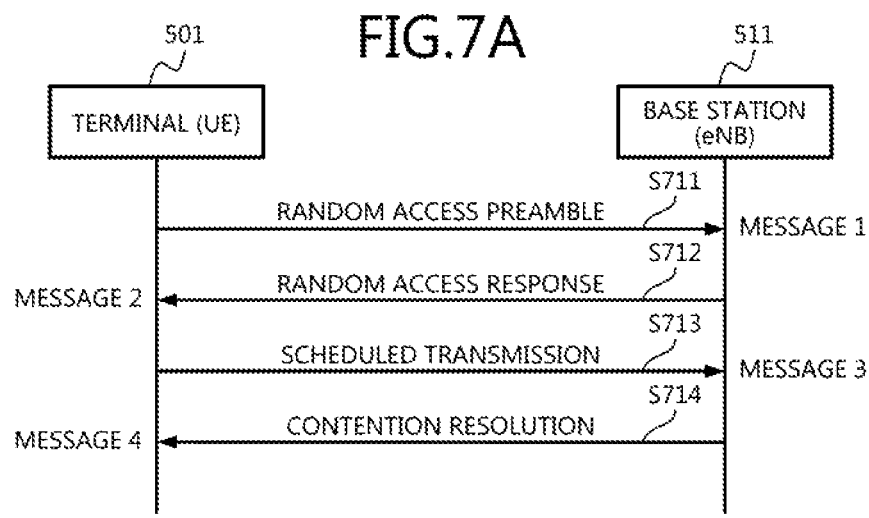
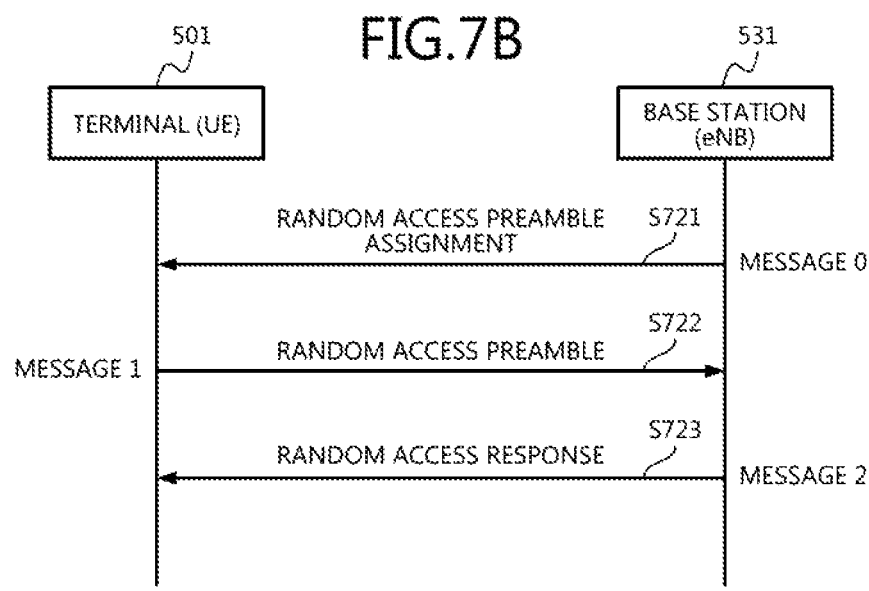

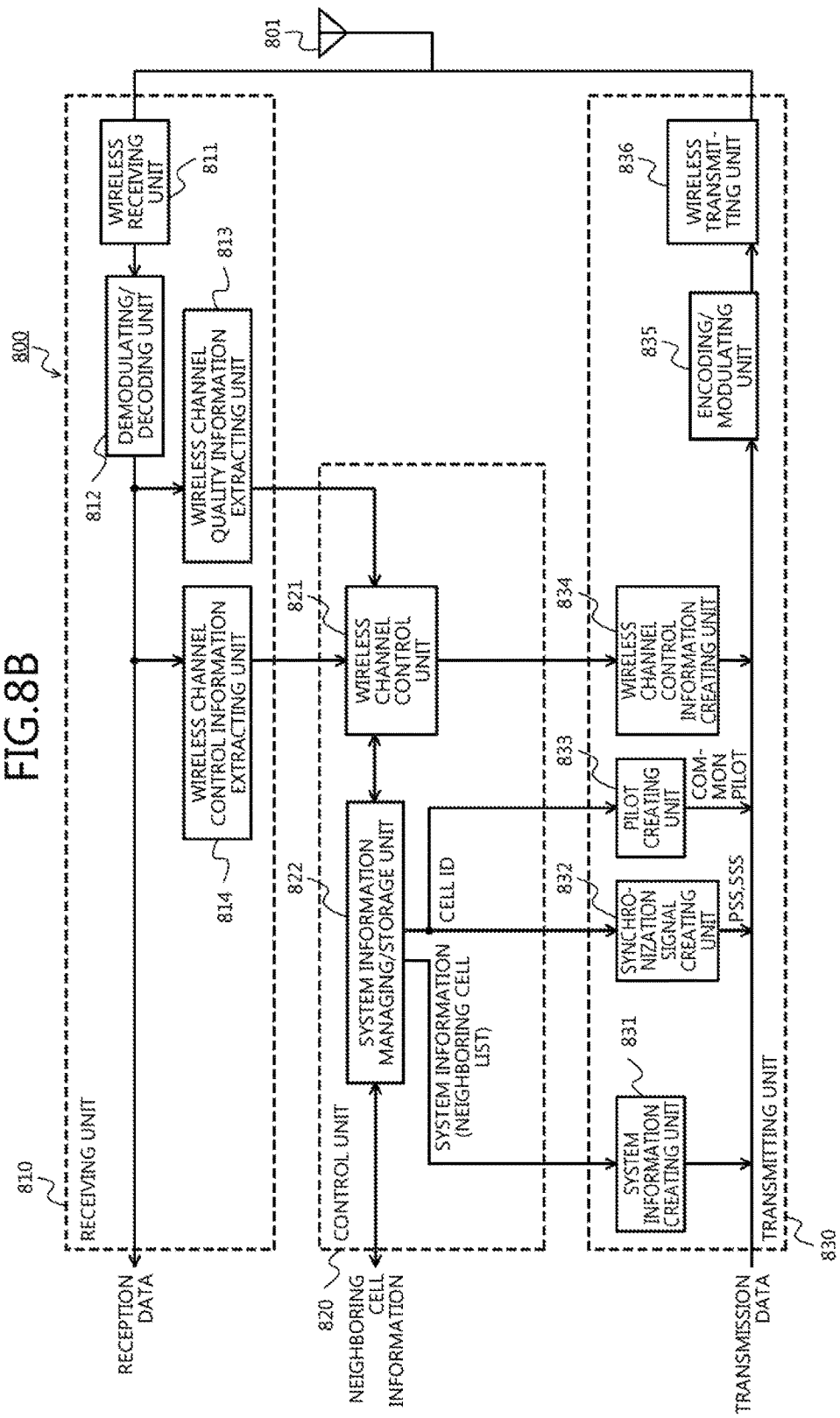

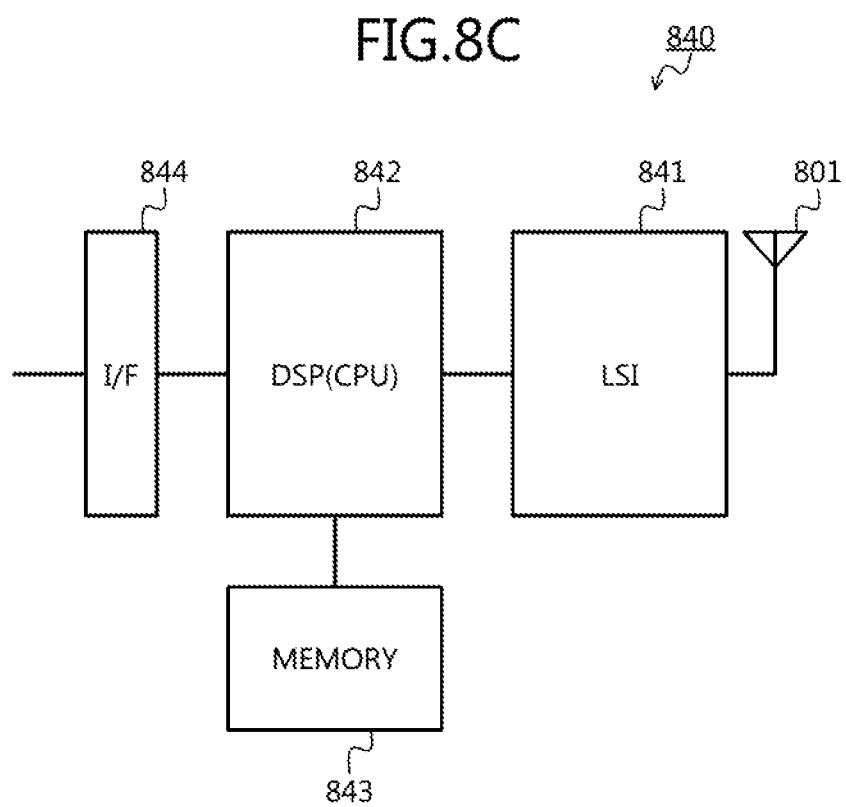

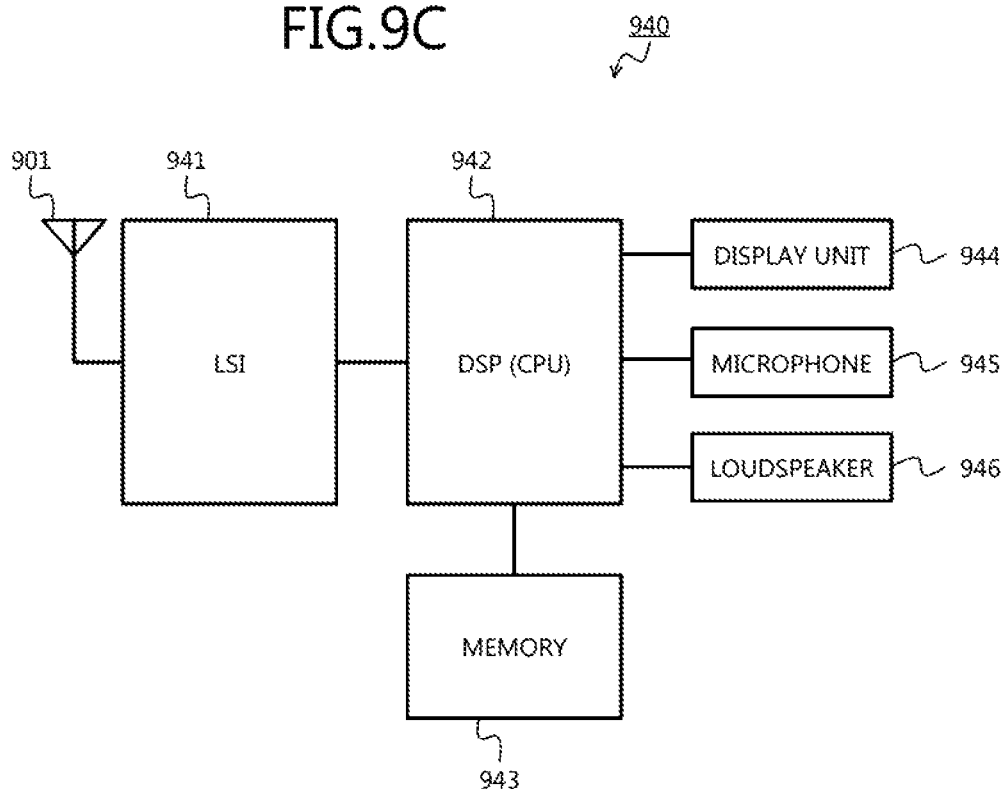

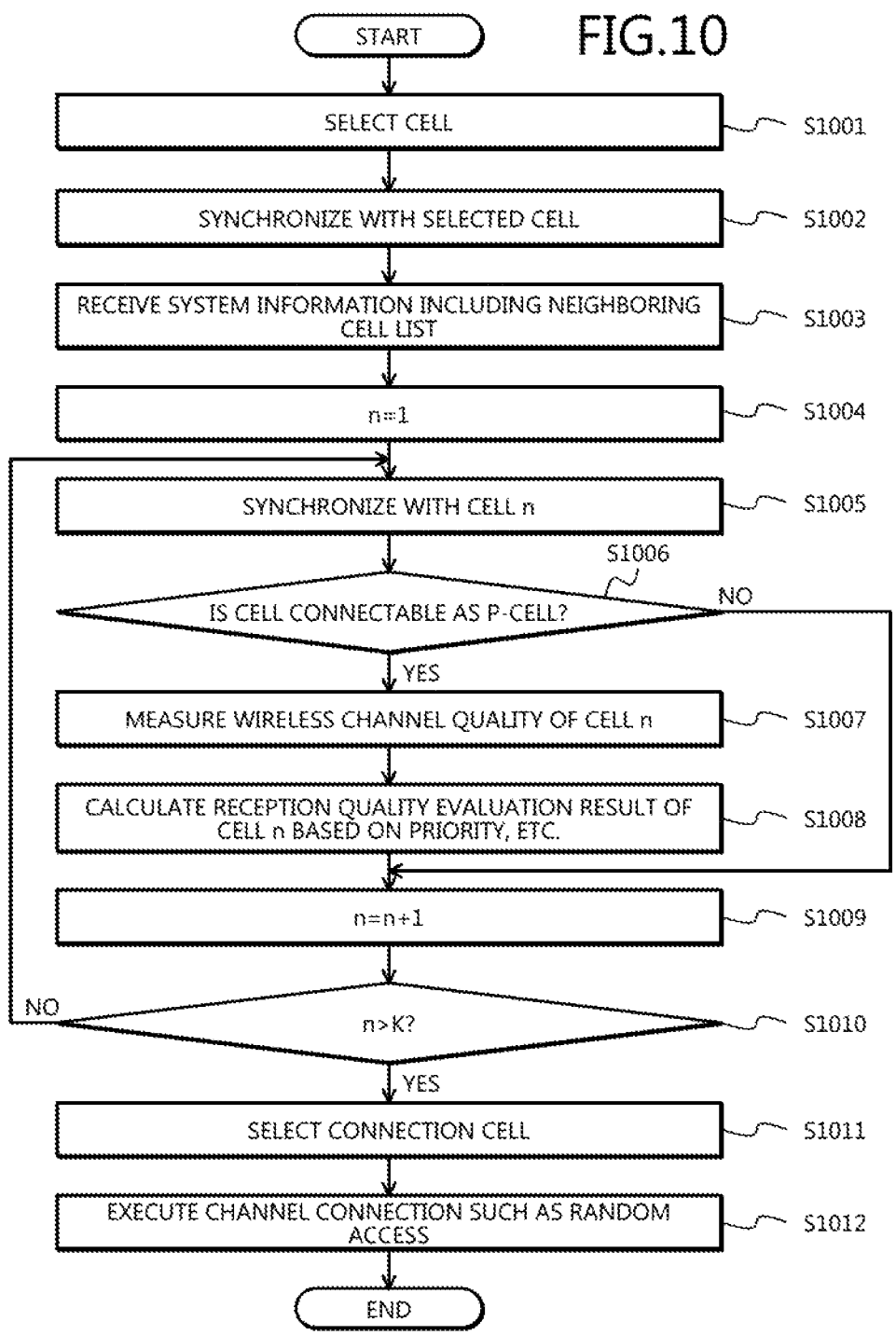

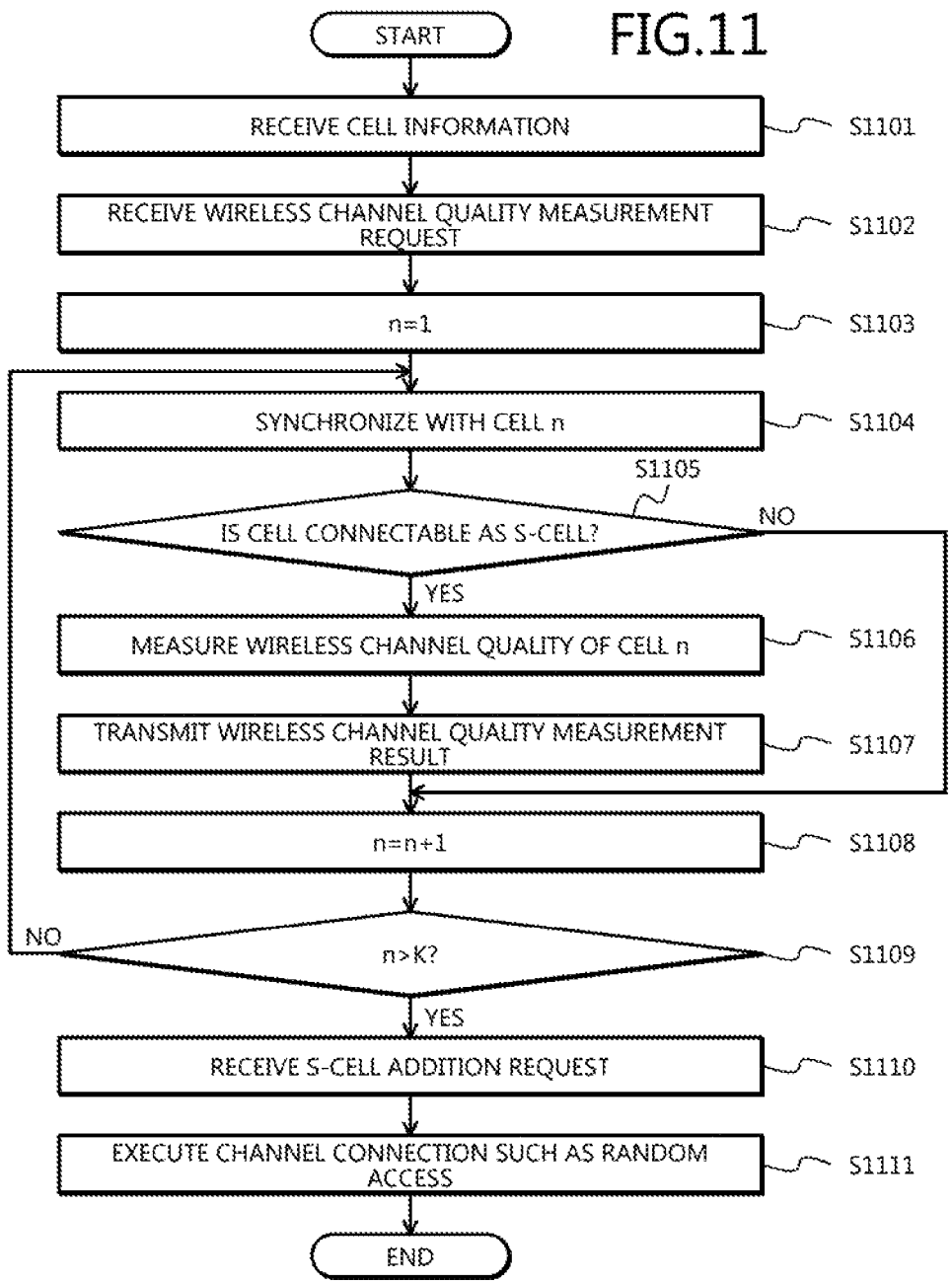

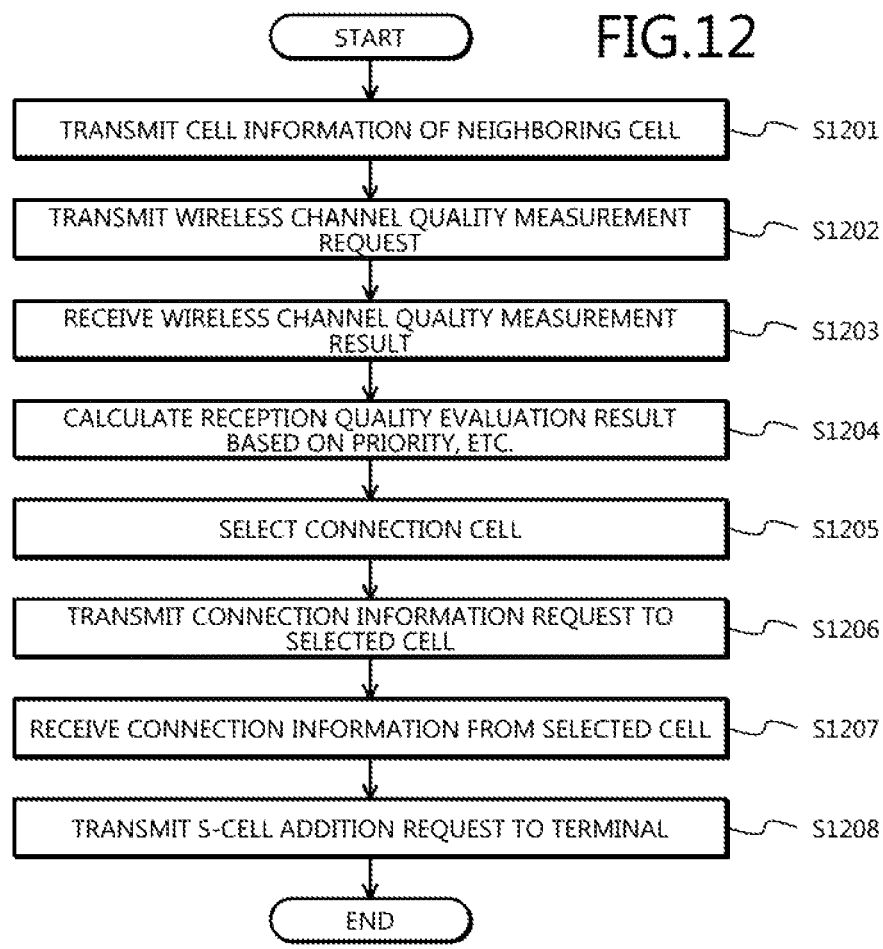

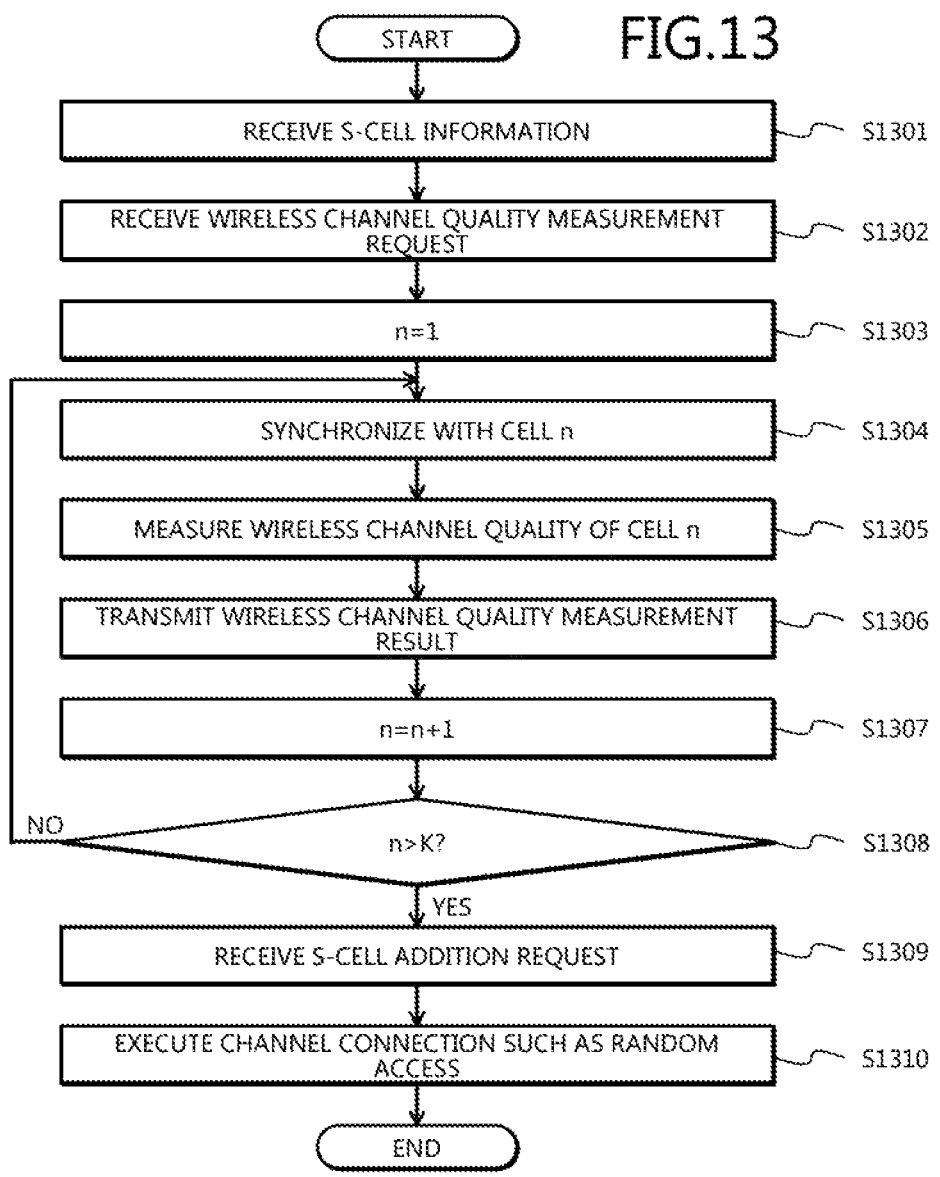

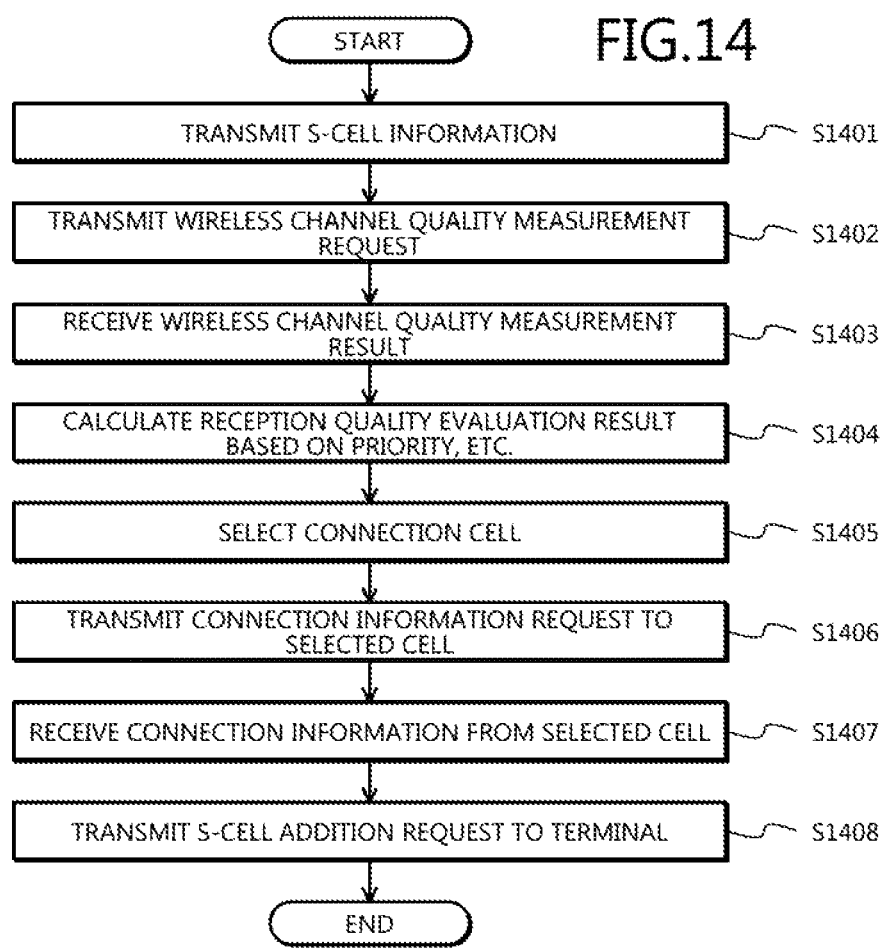

FIG.15

| CELL ID | CA EXECUTION | HCS EXECUTION | CONNECTION AS P-CELL | CONNECTION AS S-CELL | DESCRIPTION |
|---|---|---|---|---|---|
| Id1 | 1 (EXECUTED) | 1 (EXECUTED) | 1 (AVAILABLE) | 0 (UNAVAILABLE) | CA AND CONNECTABLE AS HCS P-CELL |
| Id2 | 1 (EXECUTED) | 1 (EXECUTED) | 0 (UNAVAILABLE) | 1 (AVAILABLE) | CA AND CONNECTABLE AS HCS S-CELL |
| Id3 | 1 (EXECUTED) | 1 (EXECUTED) | 1 (AVAILABLE) | 1 (AVAILABLE) | CA AND CONNECTABLE AS HCS P-CELL, S-CELL |
| Id4 | 1 (EXECUTED) | 1 (EXECUTED) | 0 (UNAVAILABLE) | 0 (UNAVAILABLE) | CA AND NOT CONNECTABLE AS HCS CELL |
| Id5 | 1 (EXECUTED) | 0 (UNEXECUTED) | 1 (AVAILABLE) | 0 (UNAVAILABLE) | CONNECTABLE AS CA P-CELL |
| Id6 | 1 (EXECUTED) | 0 (UNEXECUTED) | 0 (UNAVAILABLE) | 1 (AVAILABLE) | CONNECTABLE AS CA S-CELL |
| Id7 | 1 (EXECUTED) | 0 (UNEXECUTED) | 1 (AVAILABLE) | 1 (AVAILABLE) | CONNECTABLE AS CA P-CELL, S-CELL |
| Id8 | 1 (EXECUTED) | 0 (UNEXECUTED) | 0 (UNAVAILABLE) | 0 (UNAVAILABLE) | NOT CONNECTABLE AS CA CELL |
| Id9 | 0 (UNEXECUTED) | 1 (EXECUTED) | 1 (AVAILABLE) | 0 (UNAVAILABLE) | CONNECTABLE AS HCS P-CELL |
| Id10 | 0 (UNEXECUTED) | 1 (EXECUTED) | 0 (UNAVAILABLE) | 1 (AVAILABLE) | CONNECTABLE AS HCS S-CELL |
| Id11 | 0 (UNEXECUTED) | 1 (EXECUTED) | 1 (AVAILABLE) | 1 (AVAILABLE) | CONNECTABLE AS HCS P-CELL, S-CELL |
| Id12 | 0 (UNEXECUTED) | 1 (EXECUTED) | 0 (UNAVAILABLE) | 0 (UNAVAILABLE) | NOT CONNECTABLE AS HCS CELL |
| Id13 | 0 (UNEXECUTED) | 0 (UNEXECUTED) | 1 (AVAILABLE) | 0 (UNAVAILABLE) | CURRENTLY UNDEFINED |
| Id14 | 0 (UNEXECUTED) | 0 (UNEXECUTED) | 0 (UNAVAILABLE) | 1 (AVAILABLE) | CURRENTLY UNDEFINED |
| Id15 | 0 (UNEXECUTED) | 0 (UNEXECUTED) | 1 (AVAILABLE) | 1 (AVAILABLE) | CURRENTLY UNDEFINED |
| Id16 | 0 (UNEXECUTED) | 0 (UNEXECUTED) | 0 (UNAVAILABLE) | 0 (UNAVAILABLE) | CURRENTLY UNDEFINED |

| CELL ID | CA EXECUTION | HCS EXECUTION | CONNECTION AS P-CELL |
|---|---|---|---|
| Id1 | 1 (EXECUTED) | 1 (EXECUTED) | 1 (AVAILABLE) |
| Id2 | 1 (EXECUTED) | 1 (EXECUTED) | 0 (UNAVAILABLE) |
| Id3 | 1 (EXECUTED) | 1 (EXECUTED) | 1 (AVAILABLE) |
| Id4 | 1 (EXECUTED) | 1 (EXECUTED) | 0 (UNAVAILABLE) |
| Id5 | 1 (EXECUTED) | 0 (UNEXECUTED) | 1 (AVAILABLE) |
| Id6 | 1 (EXECUTED) | 0 (UNEXECUTED) | 0 (UNAVAILABLE) |
| Id7 | 1 (EXECUTED) | 0 (UNEXECUTED) | 1 (AVAILABLE) |
| Id8 | 1 (EXECUTED) | 0 (UNEXECUTED) | 0 (UNAVAILABLE) |
| Id9 | 0 (UNEXECUTED) | 1 (EXECUTED) | 1 (AVAILABLE) |
| Id10 | 0 (UNEXECUTED) | 1 (EXECUTED) | 0 (UNAVAILABLE) |
| Id11 | 0 (UNEXECUTED) | 1 (EXECUTED) | 1 (AVAILABLE) |
| Id12 | 0 (UNEXECUTED) | 1 (EXECUTED) | 0 (UNAVAILABLE) |
| Id13 | 0 (UNEXECUTED) | 0 (UNEXECUTED) | 1 (AVAILABLE) |
| Id14 | 0 (UNEXECUTED) | 0 (UNEXECUTED) | 0 (UNAVAILABLE) |
| Id15 | 0 (UNEXECUTED) | 0 (UNEXECUTED) | 1 (AVAILABLE) |
| Id16 | 0 (UNEXECUTED) | 0 (UNEXECUTED) | 0 (UNAVAILABLE) |

FIG.17

| CELL ID | CA EXECUTION | HCS EXECUTION | CONNECT AS P/S CELL |
|---|---|---|---|
| Id1 | 1 (EXECUTED) | 1 (EXECUTED) | 1 (P-CELL AVAILABLE) |
| Id2 | 1 (EXECUTED) | 1 (EXECUTED) | 0 (ONLY S-CELL AVAILABLE) |
| Id3 | 1 (EXECUTED) | 1 (EXECUTED) | 1 (P-CELL AVAILABLE) |
| Id4 | 1 (EXECUTED) | 1 (EXECUTED) | 0 (ONLY S-CELL AVAILABLE) |
| Id5 | 1 (EXECUTED) | 0 (UNEXECUTED) | 1 (P-CELL AVAILABLE) |
| Id6 | 1 (EXECUTED) | 0 (UNEXECUTED) | 0 (ONLY S-CELL AVAILABLE) |
| Id7 | 1 (EXECUTED) | 0 (UNEXECUTED) | 1 (P-CELL AVAILABLE) |
| Id8 | 1 (EXECUTED) | 0 (UNEXECUTED) | 0 (ONLY S-CELL AVAILABLE) |
| Id9 | 0 (UNEXECUTED) | 1 (EXECUTED) | 1 (P-CELL AVAILABLE) |
| Id10 | 0 (UNEXECUTED) | 1 (EXECUTED) | 0 (ONLY S-CELL AVAILABLE) |
| Id11 | 0 (UNEXECUTED) | 1 (EXECUTED) | 1 (P-CELL AVAILABLE) |
| Id12 | 0 (UNEXECUTED) | 1 (EXECUTED) | 0 (ONLY S-CELL AVAILABLE) |
| Id13 | 0 (UNEXECUTED) | 0 (UNEXECUTED) | 1 (P-CELL AVAILABLE) |
| Id14 | 0 (UNEXECUTED) | 0 (UNEXECUTED) | 0 (ONLY S-CELL AVAILABLE) |
| Id15 | 0 (UNEXECUTED) | 0 (UNEXECUTED) | 1 (P-CELL AVAILABLE) |
| Id16 | 0 (UNEXECUTED) | 0 (UNEXECUTED) | 0 (ONLY S-CELL AVAILABLE) |

WIRELESS COMMUNICATION SYSTEM, BASE STATION, AND TERMINAL

CROSS REFERENCE TO RELATED APPLICATIONS

This application is a continuation application of International Application PCT/JP2014/060547, filed on Apr. 11, 2014 and designating the U.S., the entire contents of which are incorporated herein by reference.

FIELD

The embodiments discussed herein relate to a wireless communication system, base station, and terminal.

BACKGROUND

Conventionally, in a mobile communication system such as a long term evolution (LTE), cell selection of selecting a cell (base station) to which a terminal is connected based on the wireless quality (good wireless channel quality) or for which the terminal waits (camps on, idles) (see, for example, Published Japanese-Translation of PCT Application, Publication No. H7-509826, International Publication No. 2011/087022, Japanese Laid-Open Patent Publication No. 2011-124732, and International Publication No. 2010/134202). Carrier aggregation (CA) is also known in which communication is performed using a primary cell and a secondary cell at the same time.

SUMMARY

According to an aspect of an embodiment, a wireless communication system includes a terminal configured to perform wireless communication concurrently using a cell of a first type enabling connection without being associated with another cell and a cell of a second type enabling connection by being associated with the cell of the first type; and a base station configured to form a first cell and transmit broadcast information through the first cell, the broadcast information including identification information of a second cell of the first type different from the first cell and giving notification that the second cell is a cell of the first type. The terminal selects the second cell as the cell of the first type for the wireless communication based on the broadcast information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram depicting an example of a system according to a first embodiment;

FIG. 1B is a diagram depicting an example of signal flow in the system depicted in FIG. 1A;

FIG. 1C is a diagram of a variant example of the system according to the first embodiment;

FIG. 3A is a diagram depicting Example 1 of carrier aggregation;

FIG. 3B is a diagram depicting Example 2 of the carrier aggregation;

FIG. 3C is a diagram depicting Example 3 of the carrier aggregation;

FIG. 4C is a diagram depicting Example 3 of the P-cell and S-cell;

FIG. 5A is a diagram depicting an example of a hierarchical cell structure;

FIG. 7A is a diagram depicting an example of contention-based random access;

FIG. 7B is a diagram depicting an example of non-contention-based random access;

FIG. 8B is a diagram depicting an example of signal flow in the base station depicted in FIG. 8A;

FIG. 8C is a diagram depicting an example of hardware configuration of the base station;

FIG. 9C is a diagram depicting an example of hardware configuration of the terminal;

FIG. 10 is a flowchart depicting an example of a P-cell connection process by the terminal;

FIG. 11 is a flowchart depicting an example of an S-cell connection process by the terminal;

FIG. 12 is a flowchart depicting an example of an S-cell selection process by the base station;

FIG. 13 is a flowchart depicting a variant of the S-cell connection process by the terminal;

FIG. 14 is a flowchart depicting a variant of the S-cell selection process by the base station;

FIG. 15 is a diagram of an example of a neighboring cell list;

FIG. 16 is a diagram of a variant example 1 of the neighboring cell list; and

FIG. 17 is a diagram of a variant example 2 of the neighboring cell list.

DESCRIPTION OF THE INVENTION

Figure 1D:
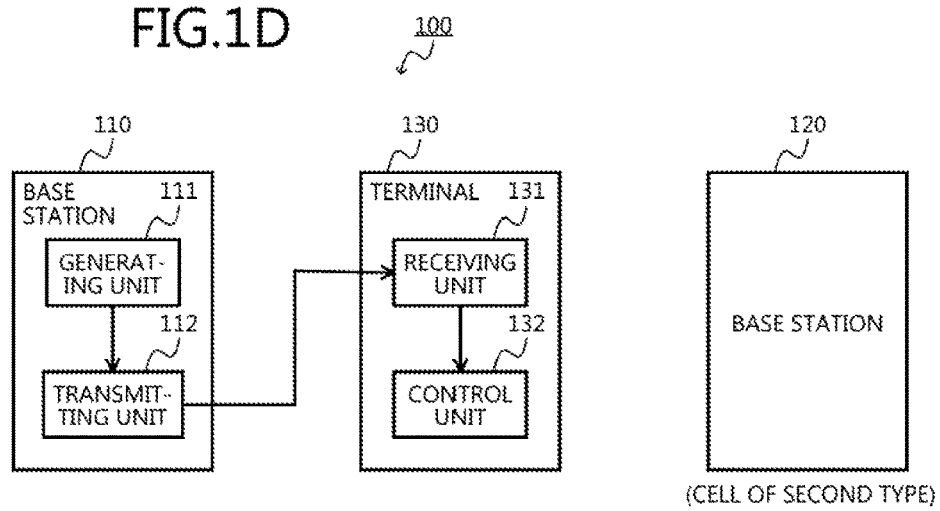
FIG. 1D is a diagram of an example of a signal flow in the system depicted in FIG. 1C.

Embodiments of a system (wireless communication system), a base station, and a terminal according to the present invention will be described in detail with reference to the accompanying drawings.

FIG. 1A is a diagram depicting an example of a system according to a first embodiment. FIG. 1B is a diagram depicting an example of signal flow in the system depicted in FIG. 1A. As depicted in FIGS. 1A and 1B, a system 100 according to the first embodiment includes base stations 110 and 120 and a terminal 130.

In the system 100, the terminal 130 performs wireless communication that uses a cell of a first type and a cell of a second type at the same time. This wireless communication is, for example, communication using plural cells (or bands) at the same time, such as carrier aggregation. The cell of the first type is a cell enabling independent connection without association with another cell. The cell of the second type is a cell enabling connection with association with the cell of the first type but is not independently connectable.

The base station 110 is a first base station forming a first cell. The first cell may be a cell of the first type or a cell of the second type. The base station 110 includes a generating unit 111 and a transmitting unit 112.

For a second cell of the first type different from the first cell formed by the base station 110, the generating unit 111 generates broadcast information including identification information of the second cell and giving notification that the second cell is a cell of the first type. The second cell is a neighboring cell (peripheral cell, adjacent cell) of the first cell, for example. In the example depicted in FIGS. 1A and 1B, the second cell is a cell formed by the base station 120.

For example, the generating unit 111 generates the broadcast information based on cell information indicating that the second cell is a cell of the first type. The cell information may be received and acquired from the base station 120, for example. The cell information may be received and acquired from a higher-level apparatus managing the base stations 110, 120. The cell information may be stored in a memory of the base station 110 and may be acquired from the memory of the base station 110 in this case. The generating unit 111 outputs the generated broadcast information to the transmitting unit 112.

The transmitting unit 112 transmits the broadcast information output from the generating unit 111 through the first cell formed by the base station 110. For example, the transmitting unit 112 stores the broadcast information output from the generating unit ill to a neighboring cell list indicating neighboring cells of the first cell and broadcasts in the first cell, the neighboring cell list having the broadcast information stored therein.

The base station 120 is a second base station different from the base station 110, for example. The base station 120 forms the second cell of the first type.

The terminal 130 includes a receiving unit 131 and a control unit 132. The receiving unit 131 receives the broadcast information transmitted from the base station 110. The receiving unit 131 outputs the received broadcast information to the control unit 132.

The control unit 132 selects the second cell formed by the base station 120 as the cell of the first type for wireless communication based on the broadcast information output from the receiving unit 131 and controls the connection of the terminal 130 to the second cell. The control unit 132 uses the connected second cell as the cell of the first type to perform the wireless communication described above.

In this way, the base station 110 according to the first embodiment transmits the broadcast information giving notification that the second cell of the first type different from the first cell formed by the base station 110 is a cell of the first type connectable without being associated with another cell. As a result, the terminal 130 may identify that the second cell is a cell of the first type, so as to select and connect to the second cell as the cell of the first type. Therefore, the terminal 130 may be prevented from making an erroneous selection of the cell of the first type such as selecting for the first type, a cell that is not independently connectable, for example.

Since the erroneous cell selection is prevented, for example, connection failures may be suppressed thereby increasing the efficiency of communication. For example, occurrence of cell reselection, a handover process, etc. may be suppressed to prevent a reduction in transmission speed.

Although the base station 110 forms the first cell and the base station 120 different from the base station 110 forms the second cell in the case described above, the base station 120 and the base station 110 may be the same base station. Therefore, for example, the base station 110 may form the first cell and the second cell.

The wireless communication described above may be wireless communication concurrently using a cell of the first type and a cell of the second type that is included in the cell of the first type and that is smaller than the cell of the first type, for example. However, the wireless communication described above is not limited thereto and may be wireless communication concurrently using a cell of the first type and a cell of the second type that includes the cell of the first type and that is larger than the cell of the first type. Therefore, the wireless communication may be wireless communication concurrently using a cell of the first type and a cell of the second type regardless of the relative size of the cells. The base station 110 may be a base station forming a cell at least partially overlapping the cell of the base station 120.

For example, when the system 100 is applied to an LTE system, the cell of the first type described above may be a primary cell (or a first cell, a first band, a main band, a main cell (a primary cell, a master cell)), for example. The cell of the second type may be a secondary cell (or a second cell, a second band, a sub-band, a sub-cell, a slave cell, an expansion band, an expansion cell), for example.

A certain cell may be a cell of the first type and a cell of the second type at the same time. A certain cell may be of the first type for a certain terminal and of the second terminal for a different terminal.

Description will be made of a case where the terminal 130 has multiple connectable second cells of the first type. The multiple second cells are formed by the one base station 120 or two or more base stations 120. In this case, based on broadcast information transmitted from the base station 110 or another base station, the terminal 130 identifies the multiple second cells and measures wireless channel quality at the terminal 130 for each of the identified multiple second cells. The broadcast information may be received and stored in advance by the terminal 130 or may be received at the time of cell selection.

Based on the measurement result of the wireless channel quality, the terminal 130 selects the cell of the first type for the wireless communication among the multiple second cells. As a result, a cell with good wireless quality may be selected from among the multiple second cells for the cell of the first type for the wireless communication so as to improve the communication quality.

For example, for a third cell of the second type different from the first cell formed by the base station 110, the base station 110 may transmit broadcast information including third identification information and giving notification that the third cell is a cell of the second type. The third cell may be a cell formed by the base station 110 or the base station 120 or may be a cell formed by another base station.

In this case, the terminal 130 selects the third cell as the cell of the second type for the wireless communication based on the broadcast information transmitted from the base station 110 and controls the connection of the terminal 130 to the third cell. The terminal 130 uses the connected second and third cells at the same time to perform the wireless communication described above. However, the selection of the cell of the second type in the terminal 130 may be made by a base station such as the base station 120, for example.

FIG. 1C is a diagram of a variant example of the system according to the first embodiment. FIG. 1D is a diagram of an example of a signal flow in the system depicted in FIG. 1C. In FIGS. 1C and 1D, portions identical to those depicted in FIGS. 1A and 1B are denoted by the same reference numerals used in FIGS. 1A and 1B and will not be described again. As depicted in FIGS. 1C and 1D, the base station 120 may form the second cell of the second type.

In this case, for the second cell of the second type different from the first cell formed by the base station 110, the generating unit 111 of the base station 110 generates broadcast information including the identification information of the second cell and giving notification that the second cell is a cell of the second type.

The control unit 132 of the terminal 130 selects the second cell formed by the base station 120 as the cell of the second type for wireless communication based on the broadcast information output from the receiving unit 131 and controls the connection of the terminal 130 to the second cell. The control unit 132 uses the connected second cell as the cell of the second type to perform the wireless communication described above.

In this way, the base station 110 according to the first embodiment may transmit the broadcast information informing that the second cell of the second type different from the first cell formed by the base station 110 is a cell of the second type made connectable by being associated with another cell. As a result, the terminal 130 can identify that the second cell is a cell of the second type, so as to select and connect to the second cell for the cell of the second type. Therefore, the terminal 130 may be prevented from making an erroneous selection of the cell of the second type such as selecting a cell of the first type for the cell of the second type. Additionally, this enables connection to a proper cell. Moreover, this enables connection to a proper cell among cells different in type.

Since erroneous cell selection is prevented, for example, connection failure may be suppressed and thereby increase the efficiency of communication. For example, occurrence of cell reselection, a handover process, etc. may be suppressed in the terminal 130 and the base stations 110, 112 to prevent a reduction in transmission speed. Additionally, the transmission speed may be improved.

For example, at present, specifications of the LTE system and the LTE-Advanced system have been studied in the $3^{rd}$ generation partnership project (3GPP). The specification of the LTE system was formulated as an LTE Release8. Furthermore, currently, the LTE-Advanced system, i.e., an evolved version of the LTE system is being studied, and the first edition of the specification of the LTE-Advanced system was drawn up as an LTE Release10. Additionally, in the 3GPP, an LTE Release12 for example, i.e. a successor of the LTE Release10 is being studied.

Figure 2:
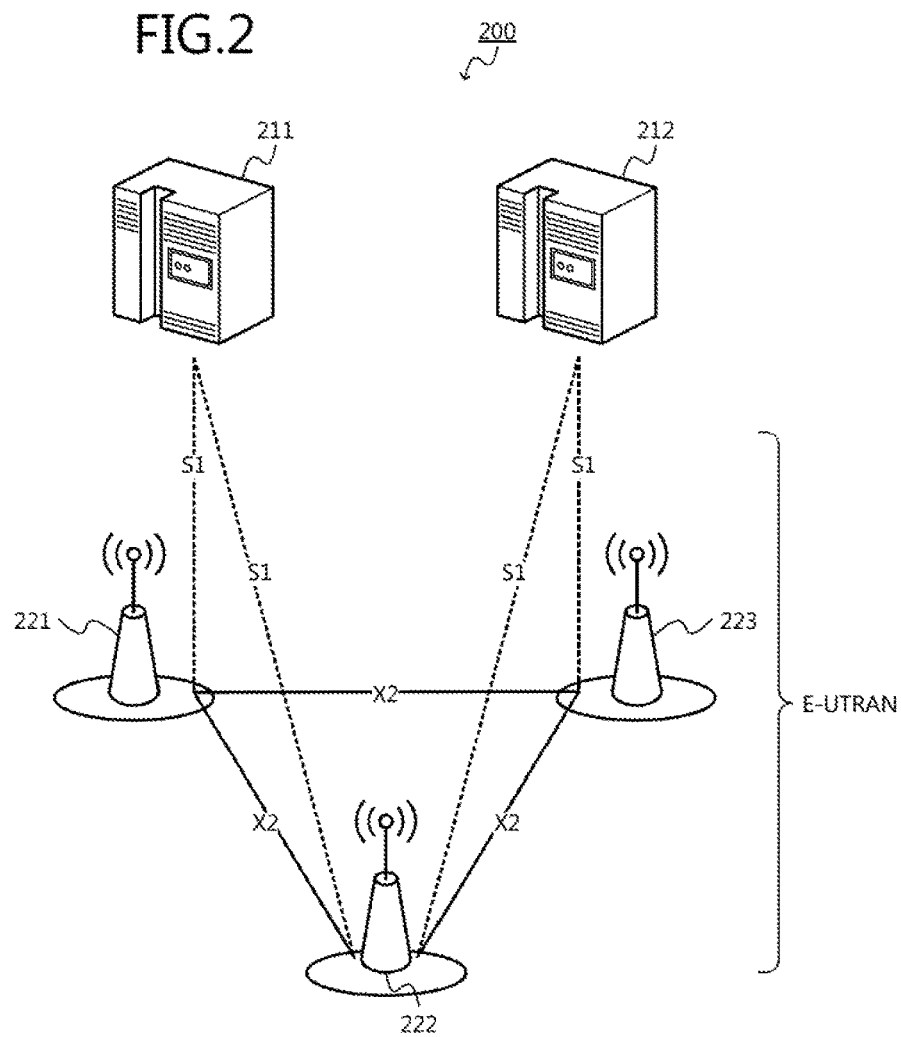
FIG. 2 is a diagram depicting an example of a communication system according to a second embodiment.

FIG. 2 is a diagram depicting an example of a communication system according to a second embodiment. As depicted in FIG. 2, a communication system 200 according to the second embodiment is an LTE system-Advanced (LTE Release10) system including MME/S-GWs 211 and 212 and base stations (eNBs) 221 to 223. The communication system 200 may include user equipment ((UE) a user terminal) performing wireless communication with the base stations 221 to 223.

Each of the MME/S-GWs 211 and 212 has functions of mobility management entity (MME) and serving gateway (S-GW). The MME/S-GW 211 is connected via S1 interfaces to the base stations 221 and 222. The MME/S-GW 212 is connected via the S1 interfaces to the base stations 222 and 223.

Each of the base stations 221 to 223 is a NodeB of an evolved universal terrestrial wireless access network (E-UTRAN) of the LTE system. The base stations 221 to 223 are connected to one another by way of X2 interfaces that are inter-base-station interfaces. Each of the base stations 221 to 223 performs voice communication with UE through wireless communication. Each of the UE is a mobile terminal (mobile station) such as a cellular phone.

The communication system 200 depicted in FIG. 2 will hereinafter be described by way of example. However, the present invention is not limited to the communication system 200 depicted in FIG. 2 and is applicable to various mobile communication systems such as the global system for mobile communications (GSM) and the wideband-code division multiple access (W-CDMA) system. The GSM is a registered trademark.

A method of implementing bandwidth expansion, which is one of the features of the LTE-Advanced system, will be described. In the LTE system, the uplink/downlink bandwidth may be configured to 1.4 [MHz], 3 [MHz], 5 [MHz], 10 [MHz], 15 [MHz], and 20 [MHz]. These are defined in, e.g., TS36.101 and TS36.104 of the 3GPP.

These configured bandwidths are called component carriers (CCs). The reason why the plural bandwidths are configured is the premise that the bandwidths allocated to the GSM system or W-CDMA system are used intactly.

In the LTE system, on the other hand, it is required to implement a high-speed transmission as compared with the GSM system or the W-CDMA system. The LTE system is, therefore, required to have a wider bandwidth as compared with the GSM system or the W-CDMA system.

In general, the bands used in the wireless communication system differ depending on the circumstances of each country. In Europe, since countries border other countries by land, the interference is required to be taken into consideration so that use frequency bands are regulated between the countries. As a result, available bandwidths are reduced and subdivided. Nevertheless, as described above, the LTE system is required to have a widened bandwidth.

Thus, the carrier aggregation has been introduced as a method of integrating and widening the narrowed and subdivided bands. When the carrier aggregation is carried out, a principal cell is configured on a terminal-to-terminal basis. This principal cell is called a first cell, primary cell, first band, primary band, main cell, etc. Hereinafter, this principal cell is referred to as a P-cell. The above-described cell of the first type is for example the P-cell.

Although the cell and the component carrier (band) intrinsically have different meanings, the definition of the cell in the 3GPP is "one configuring a single service area using a single frequency". It is thus defined that a single cell is configured for a component carrier, with one-to-one correspondence between the cell and the component carrier, so that the cell and the component carrier may be treated as synonymous. Furthermore, since a single base station has only one band, the base station and the component carrier can also be treated as synonymous.

In the carrier aggregation, another cell (band) is added and integrated to the configured P-cell. This additional cell is called a second cell, secondary cell, second band, sub band, subcell, extended band, extended cell, etc. Hereinafter, this additional cell is referred to as an S-cell. Similar to the P-cell, the S-cell and the component carrier are synonymous. The above-described cell of the second type is for example the S-cell.

Although these cells are ones obtained by dividing the band of a system, each band allows scheduling to be carried out and is capable of configuring a single system. For this reason, these cells are different from ones configuring a block (or a cluster) consisting of plural subcarriers collected together to carry out the user multiple in the orthogonal frequency division multiple access (OFDMA) for example. In other words, this may be understood to mean that one band operates as one wireless communications system.

The carrier aggregation allows up to seven S-cells to be configured. That is, the carrier aggregation is feasible using up to eight component carriers including the P-cell. The LTE-Advanced system assumes up to 100 MHz of bandwidth. For this reason, if the bandwidth of a single component carrier is 20 MHz, the number of S-cells is four at most, so that the carrier aggregation is feasible using up to five component carriers, equal to the sum of the P-cell and the S-cells.

That is, the carrier aggregation is an integration of the P-cell and at least one S-cell (see, e.g., FIGS. 3A to 3C). Hereinafter, for the simplicity of description, a case will be described where the carrier aggregation is carried out by two component carriers (i.e., one P-cell and one S-cell) at a single terminal (excluding FIG. 4C, etc.). By adding the second and subsequent S-cells, the carrier aggregation may be carried out using three or more component carriers (see FIG. 4C, etc.).

FIG. 3A is a diagram depicting Example 1 of the carrier aggregation. A band 310 depicted in FIG. 3A is a 3.5 GHz frequency band included in the system band. The bandwidth of the system band 310 is 80 MHz. The band 310 includes component carriers CC2 to CC5 for example. The bandwidth of each of the component carriers CC2 to CC5 is 20 MHz.

In the carrier aggregation, the component carriers CC2 and CC3 may be integrated for use, as depicted in FIG. 3A for example. In this manner, the carrier aggregation enables the integrated use of component carriers adjoining each other for example.

FIG. 3B is a diagram depicting Example 2 of the carrier aggregation. In FIG. 3B, parts similar to those depicted in FIG. 3A are designated by the same reference numerals used in FIG. 3B and will not again be described. In the carrier aggregation, the component carriers CC2 and CC4 may be integrated for use, as depicted in FIG. 3B, for example. In this manner, the carrier aggregation enables component carriers not adjoining each other to be integrated for use.

FIG. 3C is a diagram depicting Example 3 of the carrier aggregation. In FIG. 3C, parts similar to those depicted in FIG. 3A are designated by the same reference numerals used in FIG. 3A and will not again be described. A band 320 depicted in FIG. 3C is a 2 GHz frequency band. The band 320 includes the component carrier CC1 for example. The bandwidth of the component carrier CC1 is 20 MHz.

In the carrier aggregation, the component carriers CC1 and CC2 included in the bands 320 and 310, respectively, may be integrated for use, as depicted in FIG. 3C for example. In this manner, the carrier aggregation enables the integrated use of the component carriers having different frequency bands.

Figure 4A:
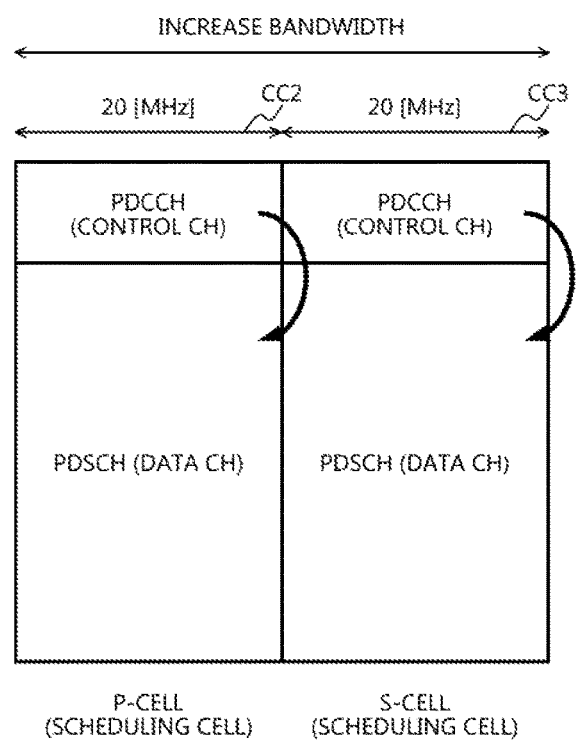
FIG. 4A is a diagram depicting Example 1 of a P-cell and S-cell.

FIG. 4A is a diagram depicting Example 1 of the P-cell and S-cell. In FIG. 4A, parts similar to those depicted in FIG. 3A are designated by the same reference numerals used in FIG. 3A and will not again be described. FIG. 4A depicts a case where in the carrier aggregation, the component carrier CC2 is selected as the P-cell and the component carrier CC3 is selected as the S-cell to thereby widen the band. In the example depicted in FIG. 4A, the component carriers CC2 and CC3 include a physical downlink control channel (PDCCH) as a control CB and a physical downlink shared channel (PDSCH) as a data CH, respectively.

In this case, both the component carriers CC2 and CC3 act as scheduling cells (serving cells). That is, in each of the component carriers CC2 and CC3, scheduling is performed and a control signal related to the scheduling is transmitted by the PDCCH. The control signal related to the scheduling includes, e.g., terminal selection, wireless resource used, modulation scheme, and coding rate. A downlink control channel (DCCH), for example, is used as a downlink control channel acting as a transport channel.

In the example depicted in FIG. 4A, data transmission is carried out using a downlink wireless shared channel and a downlink wireless control channel for data transmission in each cell, similar to a high-speed downlink packet access (HSDPA) in the W-CDMA for example. The downlink wireless shared channel is, for example, the PDSCH. The downlink wireless control channel is, for example, an enhanced-physical downlink control channel (E-PDCCH). As used herein, data means terminal-dedicated data. The terminal-dedicated data is user data or dedicated data.

Figure 4B:
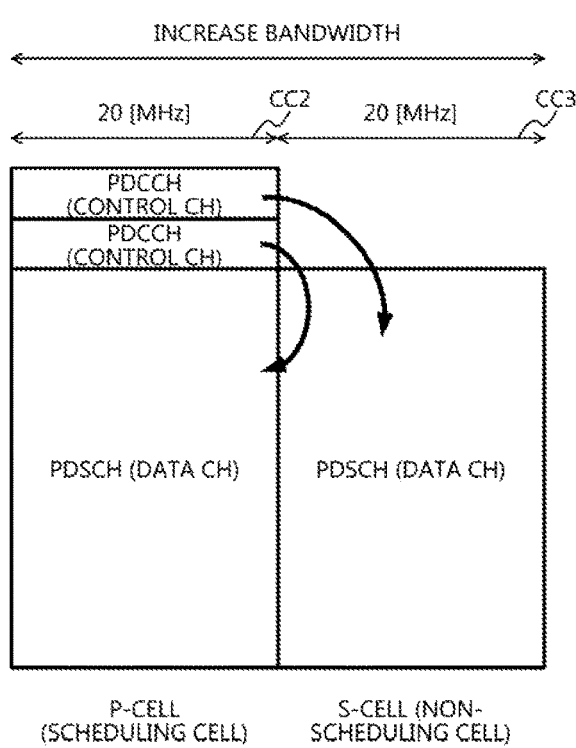
FIG. 4B is a diagram depicting Example 2 of the P-cell and S-cell.

FIG. 4B is a diagram depicting Example 2 of the P-cell and S-cell. In FIG. 4B, parts similar to those depicted in FIG. 4A are designated by the same reference numerals used in FIG. 4A and will not again be described. In the example depicted in FIG. 4B, the component carrier CC2 includes the PDCCH for the PDSCH of the component carrier CC3. In this case, the component carrier CC2 acts as the scheduling cell, while the component carrier CC3 acts as a non-scheduling cell (or a non-servicing cell).

That is, in the component carrier CC2, scheduling of the component carrier CC3 in addition to that of the component carrier CC2 is carried out. Control signals related to the component carriers CC2 and CC3 are transmitted by the PDCCH of the component carrier CC2. Here, information identifying the control signal between the component carriers CC2 and CC3 is also added to the control signals for transmission.

The scheduling is not performed in the component carrier CC3. The PDSCH of the component carrier CC3 is transmitted based on a control signal transmitted by the PDCCH of the component carrier CC2.

The scheduling and the control signal transmission method depicted in FIG. 4B are called cross-carrier scheduling. In the cross-carrier scheduling, the scheduling cell is the P-cell or the S-cell, while the non-scheduling cell is only the S-cell. That is, the P-cell acts only as the scheduling cell.

As for the example depicted in FIG. 4B, the downlink data transmission will be described by way of example. In the scheduling cell (e.g., P-cell), a control signal for data transmission of the scheduling cell is transmitted using the downlink wireless control channel (PDCCH). In the scheduling cell, data is transmitted using the downlink wireless shared channel (PDSCH), based on control information transmitted via the above-described downlink wireless control channel.

A control signal for data transmission in the non-scheduling cell is transmitted using the downlink wireless control channel (PDCCH) of the scheduling cell. In the non-scheduling cell, data is transmitted using the downlink wireless shared channel (PDSCH), based on control information for data transmission of the non-scheduling cell transmitted via the above-described downlink wireless control channel.

FIG. 4C is a diagram depicting Example 3 of the P-cell and S-cell. In FIG. 4C, parts similar to those depicted in FIG. 4A are designated by the same reference numerals used in FIG. 4A and will not again be described. The component carrier CC5 depicted in FIG. 4C is a component carrier adjoining the component carrier CC4 toward the high-frequency side. FIG. 4C depicts a case where in the carrier aggregation, the component carrier CC2 is selected as the P-cell and the component carriers CC3 to CC5 are selected as the S-cells.

In the example depicted in FIG. 4C, the component carrier CC2 includes the PDCCH for the PDSCH of the component carrier CC3. In the example depicted in FIG. 4C, the component carrier CC4 includes the PDCCH for the PDSCH of the component carrier CC5.

In this case, the component carriers CC2 and CC4 act as the scheduling cells, while the component carriers CC3 and CC5 act as the non-scheduling cells. That is, the component carrier CC2 performs scheduling of the component carrier CC3 in addition to that of the component carrier CC2. Control signals related to the component carriers CC2 and CC3 are then transmitted by the PDCCH of the component carrier CC2. Here, information identifying the control signal between the component carriers CC2 and CC3 is also added for transmission.

The scheduling is not performed in the component carrier CC3 and the PDSCH of the component carrier CC3 is transmitted based on a control signal transmitted by the PDCCH of the component carrier CC2.

In the same manner, the component carrier CC4 performs scheduling of the component carrier CC5 in addition to that of the component carrier CC4. Control signals related to the component carriers CC4 and CC5 are transmitted by the PDCCH of the component carrier CC4. Here, information identifying the control signal between the component carriers CC4 and CC5 is also added for transmission.

The scheduling is not performed in the component carrier CC5 and the PDSCH of the component carrier CC5 is transmitted based on a control signal transmitted by the PDCCH of the component carrier CC4.

As depicted in FIG. 4C, two or more S-cells may be disposed for the P-cell. The cross-carrier scheduling may not be applied to all of the S-cells as depicted in FIG. 4C. That is, in the case that plural cells are present, the cross-carrier scheduling may be applied to a certain S-cell without being applied to the other cells. As depicted in FIG. 4C, similar to the P-cell, the S-cell may also transmit the downlink control channel (PDCCH) for the other component carrier.

As depicted in FIGS. 4B and 4C, at least three wireless channels (two PDCCHs and one PDSCH) are downlink transmitted in the scheduling cell performing the cross-carrier scheduling. Besides these, for example, a physical broadcast channel (PBCH), a physical synchronization channel (PSCH), a physical control format indicator channel (PCFICH), a physical hybrid-ARQ indicator channel (PH-ICH), etc. may be transmitted.

In the non-scheduling cell, on the other hand, at least one wireless channel (PDSCH) is downlink transmitted.

A case has been described herein where the first component carrier is configured as the P-cell and the second component carrier is configured as the S-cell for a certain first terminal. A case will be described where in this case there is another second terminal using only the second component carrier.

Here, the second component carrier acts as the P-cell in the second terminal. For this reason, in the second component carrier, the above-described PBCH, PSCH, PCFICH, PHICH, etc. are transmitted for the second terminal using only the second component carrier.

On the other hand, in the certain first terminal having the first component carrier as the P-cell and the second component carrier as the S-cell, it is not essential to receive the PBCH, PSCH, PCFICH, etc. transmitted by the second component carrier. Hence, reception of these wireless channels may not be necessary at the first terminal. In this manner, in the second component carrier, the PBCH, PSCH, PCFICH, etc. unnecessary for the first terminal may be downlink transmitted due to the second terminal having the second component carrier as the P-cell.

In the following description, the scheduling cell is defined as a component carrier transmitting the PDCCH for its own cell or another cell, while the non-scheduling cell is defined as a component carrier transmitting only the downlink wireless shared channels (PDSCH) without transmitting the PDCCH.

In the 3GPP, the P-cell that is a first connected cell at the time of channel configuration may be called an anchor component. The channel configuration means random access channel configuration executed in a cell selected by the terminal for example.

As described above, the terminal can connect only one cell at the time of wireless channel configuration. For this reason, the connected cell at the wireless channel configuration acts as the P-cell. The P-cell may be changed by handover, etc. after the wireless channel configuration. The addition, deletion, and change of the S-cells are also feasible.

When configuring a wireless channel between the terminal and the base station, up to eight serving cells (scheduling cells) are configured by ServCellIndex IE that is an L3 control signal. Here, the ServCellIndex=0 represents a P-cell, while the ServCellIndex=1 to 7 represent an S-cell (see, e.g., TS36.331 of the 3GPP).

The S-cell may be added at a time other than at the wireless channel configuration. The wireless channel configuration may be reset or altered by handover, etc.

The ServCellIndex IE is included in CrossCarrierSchedulingConfig IE. The CrossCarrierSchedulingConfig IE is included in PhysicalConfigDedicated IE. The PhysicalConfigDedicated IE is included in RadioResourceConfigDedicated IE. The RadioResourceConfigDedicated IE is included in an RRCConnectionReconfiguration message and is notified from the base station to the terminal.

The S-cell is notified by ScellIndex IE. The ScellIndex IE is included in the RRCConnectionReconfiguration message and is notified from the base station to the terminal.

As described above, execution of the carrier aggregation between different base stations is being studied. In this case, a component carrier used in the carrier aggregation is selected from among up to seven S-cells (ServCellIndex IE=1 to 7) configured as described above.

The 3GPP specification defines that "a cell is a service area configured using a single frequency", which means that one cell corresponds to one base station in this definition. In the carrier aggregation, however, plural cells may correspond to one base station.

In the conventional carrier aggregation, plural component carriers are configured for the same base station so that the component carriers of the same base station carry out the carrier aggregation. At present, the carrier aggregation between the base stations (between the eNBs) is being studied. This is similar to the execution of Dual Cell-HSDPA (DC-HSDPA) between the base stations.

The execution of the DC-HSDPA between different base stations is called Dual Band-HSDPA (DB-HSDPA) or Dual Band-Dual Cell-HSDPA (DB-DC-HSDPA) and is expressed in specifications.

A configuration where plural small cells (e.g. picocells, nanocells, phantom cells) are arranged within a large cell (e.g. a macrocell) has been studied from W-CDMA release99. This configuration is called an umbrella cell configuration or a hierarchical cell structure (HCS). Hereinafter, this configuration is referred to as the hierarchical cell structure. A case where all of the area of the small cells is encompassed in the large cell and the case where only a part thereof is encompassed, are considered. In the latter case, remaining portions may be encompassed in another large cell.

The hierarchical structure is configured to include plural layers in which large cells (higher-level cells, macrocells) and small cells (lower-level cells, picocells) are stacked. As used herein, a relatively large cell is referred to as the large cell, while a relatively small cell is referred to as the small cell. The hierarchical cell structure does not necessarily have differing cell sizes.

FIG. 5A is a diagram depicting an example of the hierarchical cell structure. A communication system 500 depicted in FIG. 5A is an example of the communication system 200 depicted in FIG. 2 for example. The communication system 500 has the hierarchical cell structure including a terminal 501, a base station 511, and base stations 531 to 538.

The system 100 depicted in FIGS. 1A to 1D may be implemented as the communication system 500 depicted in FIG. 5A, for example. In this case, the base station 110 depicted in FIGS. 1A to 1D may be implemented by the base station 511 for example. The base station 120 depicted in FIGS. 1A to 1D may be implemented by the base stations 531 to 538, for example. The terminal 130 depicted in FIGS. 1A to 1D may be implemented by the terminal 501, for example.

The base station 511 is a macro base station having a larger transmission power than the base stations 531 to 538. A large cell 521 is the cell of the base station 511. The base stations 531 to 538 are (small-sized) base stations having a smaller transmission power than the base station 511, forming the picocells, nanocells, phantom cells, etc. Cells having a smaller cell radius are called the picocell, nanocell, and phantom cell in the mentioned order. Small cells 541 to 548 are cells of the base stations 531 to 538.

The communication system 500 has a hierarchical structure in which the base stations 531 to 538 (small cells 541 to 548) are arranged in the large cell 521. A case will be described where the carrier aggregation is carried out for the communication system 500 having the hierarchical cell structure.

Figure 5B:
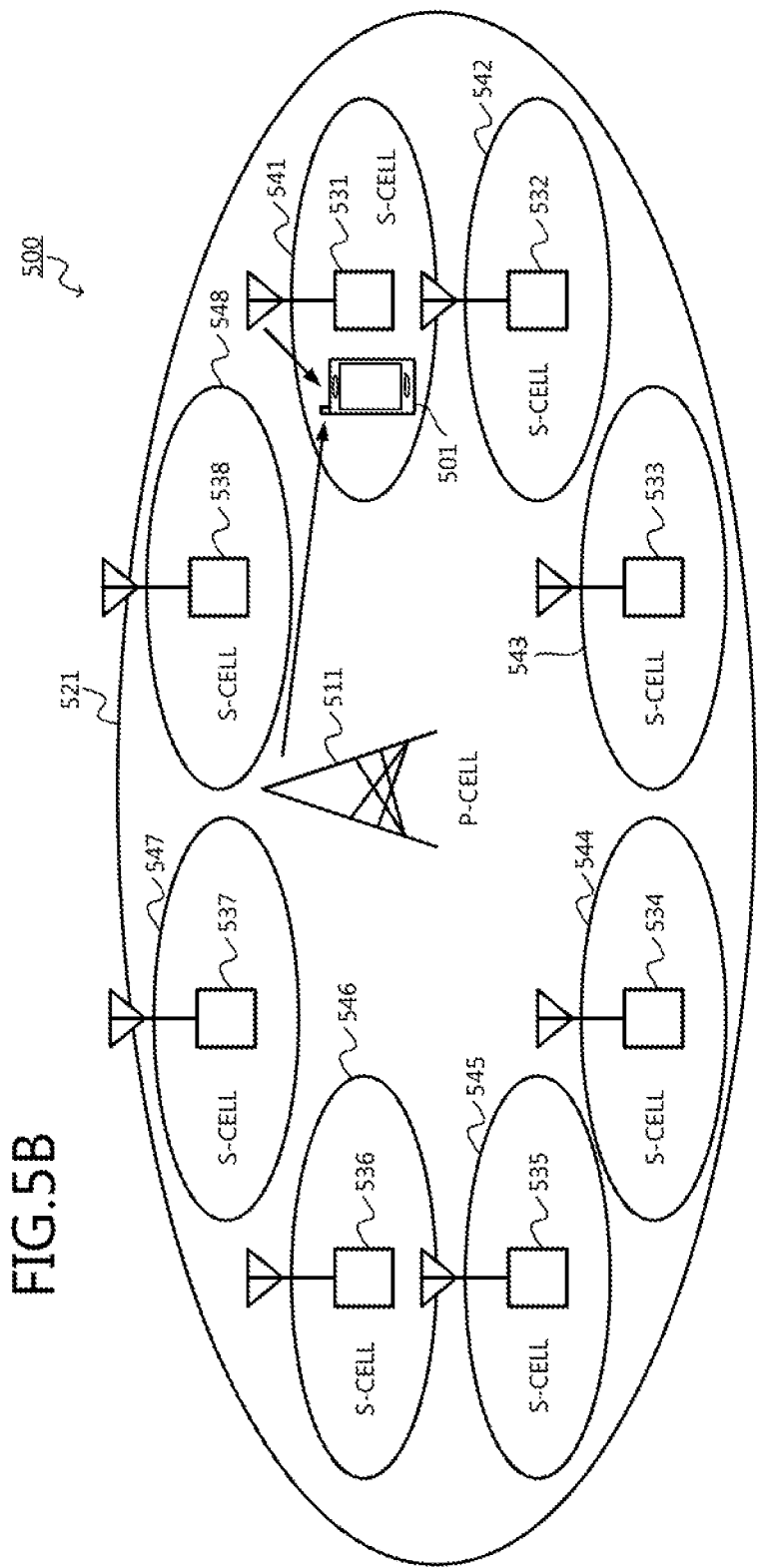
FIG. 5B is a diagram depicting an example of the carrier aggregation in the hierarchical cell structure.

FIG. 5B is a diagram depicting an example of the carrier aggregation in the hierarchical cell structure. For example, as depicted in FIG. 5B, the carrier aggregation is performed in the communication system 500 with the large cell 521 as the P-cell and the small cells 541 to 548 as the S-cells. However, the carrier aggregation may be performed with the large cell 521 as the S-cell and the small cells 541 to 548 as the P-cells.

There may be cells connectable as both the P-cell and the S-cell. The following description will be given of a case where the carrier aggregation is performed with the large cell 521 as the P-cell and the small cells 541 to 548 as the S-cells.

For example, in the communication system 500, the P-cell mainly transmits a control signal while the S-cell mainly transmits user data. This enables frequency use efficiency to be improved. This is an effect arising from the subdivision of the cell. The propagation loss is small due to a small terminal-to-base station distance of the S-cell. For this reason, the transmission power required for the user data transmission may be reduced in the uplink data transmission, enabling the power consumption to be reduced in the terminal 501.

Figure 6A:
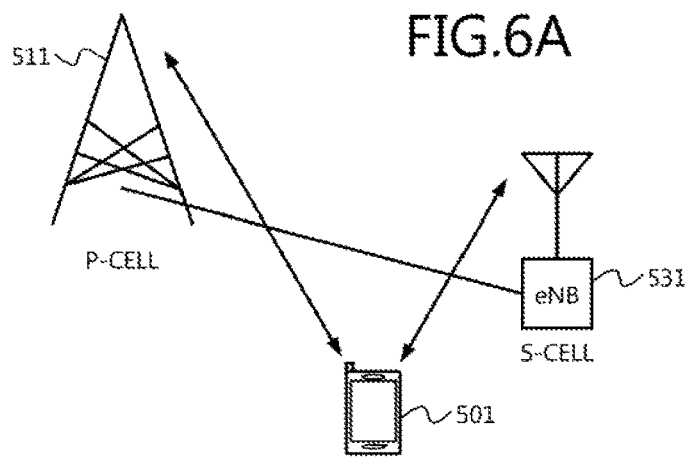
FIG. 6A is a diagram depicting Example 1 of a base station acting as the S-cell.

FIG. 6A is a diagram depicting Example 1 of the base station acting as the S-cell. In FIG. 6A, parts similar to those depicted in FIG. 5A are designated by the same reference numerals used in FIG. 5A and will not again be described. A case will be described where the carrier aggregation is performed with the base station 511 as the P-cell and the base station 531 as the S-cell.

For example, as depicted in FIG. 6A, the base station 531 acting as the S-cell may be for example a base station (evolved Node B (eNB)) connected by wire to the base station 511 (macro base station). In this case, the base stations 511 and 531 are connected to each other via the Internet or Intranet using Ethernet (registered trademark).

The base stations 511 and 531 may be connected to the MME (e.g. MME/S-GWs 211 and 212 depicted in FIG. 2), which is a higher-level apparatus of the base stations 511 and 531 and that manages the movement of the terminal 501. Here, the base station 531 configuring the small cell 541 may be connected directly to the MME or may be connected to the MME by way of the base station 511 configuring the large cell 521. The base station 531 may be a femto base station connected by a public channel (public circuit, public line) for example or may be a small base station (or a pico base station) connected via a dedicated channel (dedicated circuit, dedicated line) owned by a mobile network operator.

Figure 6B:
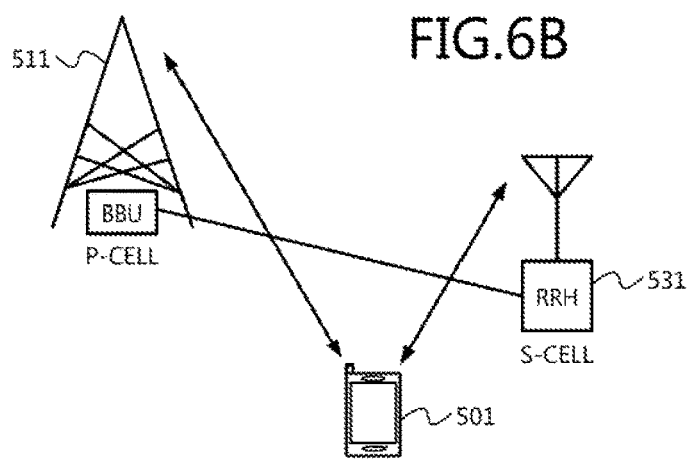
FIG. 6B is a diagram depicting Example 2 of the base station acting as the S-cell.

FIG. 6B is a diagram depicting Example 2 of the base station acting as the S-cell. In FIG. 6B, parts similar to those depicted in FIG. 6A are designated by the same reference numerals used in FIG. 6A and will not again be described. As depicted in FIG. 6B, the base station 531 may be a remote radio head (RRH) connected to a baseband unit (BBU) disposed in the base station 511. The RRH performs e.g. amplification of transmitting signals and receiving signals. The BBU performs processing such as modulation and demodulation. A dedicated channel such as optical channel may be used for the connection between the BBU and the RRH. The RRH may be called a satellite base station.

Figure 6C:
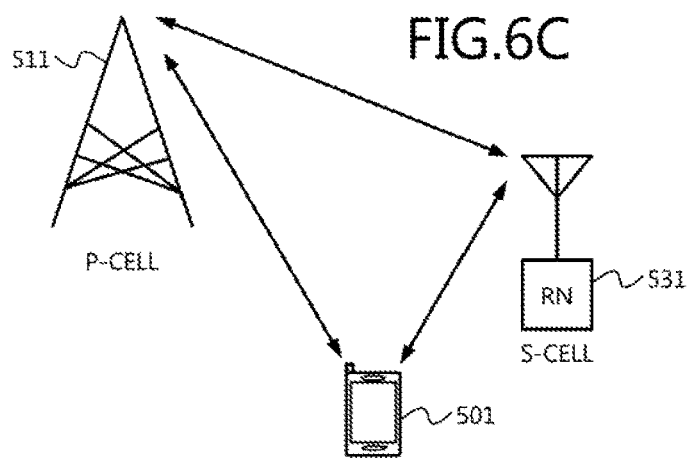
FIG. 6C is a diagram depicting Example 3 of the base station acting as the S-cell.

FIG. 6C is a diagram depicting Example 3 of the base station acting as the S-cell. In FIG. 6C, parts similar to those depicted in FIG. 6A are designated by the same reference numerals used in FIG. 6A and will not again be described. As depicted in FIG. 6C, the base station 531 may be a relay node (RN) that wireless relays communications of the base station 511. In this case, the base stations 511 and 531 are connected by wireless to each other.

In the following description, the configuration depicted in FIG. 6A will be described. It is, however, to be noted that the present invention may be implemented similarly also in the configurations depicted in FIGS. 6B and 6C.

A first selection of a cell in the hierarchical cell structure will be described. An example of TS36.304 that is the LTE specification will here be described.

In a first cell selection of the P-cell for example, the terminal 501 selects a cell satisfying formulae (1) to (3) below.

$$\text{Srxlev} > 0 \text{ AND } \text{Squal} > 0 \tag{1}$$

$$\text{Srxlev} = Q_{rxlevmeas} - (Q_{rxlevmin} + Q_{rxlevminoffset}) - P\text{compensation} \tag{2}$$

$$\text{Squal} = Q_{qualmeas} - (Q_{qualmin} + Q_{qualminoffset}) \tag{3}$$

In formula (1), Srxlev is a compensated received power of a target cell in the terminal 501. Squal is a compensated reception quality of the target cell in the terminal 501.

In formula (2), $Q_{rxlevmeas}$ is a result of measurement of the received power of the target cell in the terminal 501. The measurement result of the received power is, for example, a reference signal received power (RSRP). $Q_{rxlevmin}$ is a required received power. The required received power is a minimum received power [dBm] for satisfying a required error rate (e.g. bit error rate BER=0.01 or block error rate BLER=0.1) or a required transmission speed, for example. A reference signal (RS) corresponds to a pilot in a typical wireless communication system.

$Q_{rxlevminoffset}$ is an offset of the received power. Pcompensation is a compensation value that depends on the transmission power of a base station. For example, since the received power decreases if the transmission power of the base station decreases, compensation is carried out using Pcompensation. $Q_{rxlevmin}$, $Q_{rxlevminoffset}$, etc. are broadcasted as system information (system information block type 1 (SIB1)) to the terminal 501.

In this manner, the compensated received power Srxlev is a reception quality evaluation result based on the result obtained by subtracting the sum of the required received power and the broadcasted received power offset, from the measured received power. That is, Srxlev evaluates the margin for the required received power, while taking the received power offset into consideration.

In formula (3), $Q_{qualmeas}$ is a result of measurement of the reception quality of the target cell in the terminal 501. The reception quality measurement result is for example a reference signal reception quality (RSRQ). $Q_{qualmin}$ is a required reception quality. The required reception quality is a minimum reception quality for satisfying the required error rate or the required transmission speed for example. The reception quality is for example a signal noise ratio (SNR) or a signal-to-interference ratio (SIR).

$Q_{qualminoffset}$ is an offset of the required reception quality. Pcompensation is a compensation value that depends on the transmission power of a base station. For example, since the reception quality decreases if the transmission power of the base station decreases, compensation is carried out by Pcompensation. $Q_{qualmin}$, $Q_{qualminoffset}$, etc. are broadcasted as system information (SIB1) to the terminal 501.

In this manner, the compensated reception quality Squal is a reception quality evaluation result based on the result obtained by subtracting the sum of the required reception quality and the broadcasted reception quality offset, from the measured reception quality. That is, Squal evaluates the margin for the required reception quality, while taking the reception quality offset into consideration.

Although both Srxlev and Squal are used in a frequency division duplex (FDD) of the W-CDMA system, only the Srxlev is used in a time division duplex (TDD) of the W-CDMA system. The LTE Release8 also uses only Srxlev.

A cell reselection in the hierarchical cell structure will be described. The cell reselection is to again select a cell in the case of the elapse of a certain time in no communication state or due to cutoff of the channel after channel connection (see e.g., TS25.304 of the 3GPP).

In the cell reselection of the P-cell for example, the terminal 501 calculates $H_s$ and $H_n$ indicated in formula (4) below. The terminal 501 then ranks cells based on $H_s$ and $H_n$, to select a cell with a highest rank.

$$H_s = Q_{meas,n} - Qhcs_n$$

$$H_n = Qhcs_n - TO_n * L_n \tag{4}$$

$H_s$ in formula (4) is a reception quality evaluation result for the cell (serving cell) in connection. $H_s$ is a value obtained by subtracting a threshold value ($Qhcs_s$) of the quality of the wireless channel from the cell in connection, from the quality ($Q_{meas,s}$) of the downlink wireless channel from the cell in connection. $Q_{meas,s}$ is a reception quality (CPICH Ec/No) of a common pilot channel for example. "s" is a suffix indicative of serving (serving cell), i.e. a connection destination cell or a standby cell.

$H_s$ in formula (4) is a reception quality evaluation result for a neighboring cell, i.e., a neighboring cell. $H_n$ is a value obtained by subtracting a threshold value ($Qhcs_n$) of the quality of the wireless channel from the neighboring cell and the product of $TO_n$ and $L_n$, from the quality ($Q_{meas,n}$) of the downlink wireless channel from the neighboring cell. $Q_{meas,n}$ is for example the reception quality (CPICH Ec/No) of the common pilot channel. "n" is a suffix indicative of neighboring, i.e., a neighboring cell.

$TO_n$ is an adjustment value (offset) for different measurement timing. $L_n$ is a value becoming 0 when the priority of a cell in connection and the priority of a neighboring base station coincide with each other, but becoming 1 when they do not coincide with each other. $TO_n$ and $L_n$ in formula (4) may be obtained by formula (5), for example.

$$TO_n = \text{TEMP\_OFFSET}_n * W(\text{PENALTY\_TIME}_n - T_n)$$

$$L_n = 0 (\text{HCS\_PRIO}_n = \text{HCS\_PRIO}_n)$$

$$L_n = 1 (\text{HCS\_PRIO}_n \neq \text{HCS\_PRIO}_n)$$

$$W(x) = 0 (x < 0)$$

$$W(x) = 1 (x \geq 0) \tag{5}$$

In formula (5), $\text{PENALTY\_TIME}_n$ is an offset for different measurement timing of a neighboring cell (peripheral cell). $\text{TEMP\_OFFSET}_n$ is an offset for the duration of $\text{PENALTY\_TIME}_n$. $\text{HCS\_PRIO}_s$ is the priority in the cell in connection. $\text{HCS\_PRIO}_n$ is the priority in the neighboring cell. $W(x)$ is a weighting function. $T_n$ is a reception quality measurement timing.

$Qhcs_s$, $Qhcs_n$, $\text{HCS\_PRIO}_s$, $\text{HCS\_PRIO}_n$, $\text{PENALTY\_TIME}_n$, etc. are broadcasted as system information to the terminal 501 (see, e.g., TS36.304 and TS36.331 of the 3GPP).

For example, if the measurement timing $T_n$ is longer than $\text{PENALTY\_TIME}_n$, $W(x)=0$ is obtained. For this reason, if the quality ($Q_{meas,n}$) of the downlink wireless channel from the neighboring cell is higher than the threshold value ($Qhcs_n$), the reception quality evaluation result ($H_n$) of the neighboring cell becomes a value greater than 0. In the same manner, if the quality ($Q_{meas,s}$) of the downlink wireless channel from the cell in connection is higher than the threshold value ($Qhcs_s$), the reception quality evaluation result ($H_s$) of the cell in connection becomes a value greater than 0.

The measurement of the wireless channel quality by the terminal 501 will be described. By allowing the symbol synchronization, the terminal 501 can fetch only a pilot signal from the base station. The terminal 501 then measures the received power (RSRQ) of the fetched pilot signal. The terminal 501 compares a calculated pilot signal sequence with the received pilot signal sequence, to measure the received signal quality (RSRQ).

The reception of system information by the terminal 501 will be described. By synchronization with a transmitting signal from the neighboring base station, the terminal 501 can receive system information broadcasted from the neighboring base station. In the LTE system for example, the system information is a master information block (MIB) and a system information block (SIB).

The MIB includes information such as downlink frequency bandwidth and wireless frame number. At present, the SIB is defined from SIB1 up to SIB16 (system information block type 16). However, the SIB may further be increased.

These types of system information are transmitted through a broadcast control channel (BCCH) that is a logical channel. The BCCH is mapped to a broadcast channel (BCH) or a downlink shared channel (DL-SCH) that are transport channels.

The system information is further transmitted to the terminal 501 using a wireless channel in the form of the PBCH or the PDSCH. The system information is broadcasted as common control information to the terminal 501 connected to the base station for waiting or receiving, not only through the wireless broadcast channel but also through the wireless downlink shared channel. The broadcast refers to so-called broadcasting, and the terminal 501 does not transmit to the base station, a response to the broadcast signal.

This system information includes a neighboring cell list (peripheral cell list, adjacent cell list). The neighboring cell list is a list of base stations neighboring (in the periphery of) a base station transmitting the system information, for example. Alternatively, the neighboring cell list may be a list of neighboring cells of a cell to which the system information is transmitted. The same base station or different base stations may form the cell to which the system information is transmitted and the neighboring cells thereof.

The terminal 501 uses the neighboring cell list for the cell selection when establishing a channel connection again after a channel is released because of termination of communication, for example. The terminal 501 also uses the neighboring cell list for cell reselection if communication is interrupted for a certain period, for example. The neighboring cell list is maintained even if the terminal 501 is moved or powered off, and is utilized at a subsequent channel configuration.

P-cell selection information indicating whether each of the neighboring cells is a cell connectable as the P-cell is included in the neighboring cell list. The P-cell selection information includes, for example, a state of being the P-cell, a priority when the cell is selected for the P-cell, offset information for wireless channel quality used at the time of cell selection, etc. Additionally, control information indicating the execution of carrier aggregation and the presence of hierarchical cell structure may be transmitted as the system information.

S-cell information indicating whether each of the neighboring cells is a cell connectable as the S-cell may also be included in the neighboring cell list. The S-cell selection information includes, for example, information indicating a state of being the S-cell, a priority when the cell is selected for the P-cell, an offset for wireless channel quality used at the time of cell selection, etc. Additionally, the neighboring cell list may include information indicating the presence of hierarchical cell structure (see, e.g., FIGS. 15 to 17).

The conventional cell selection information is the priority, the offset information used for the cell selection, etc. and it has not yet been defined whether each cell is to be used as the P-cell or as the S-cell. Therefore, in the case of executing the cell selection using the conventional cell selection information, failure such as erroneous selection of a cell to be used as the S-cell, as the P-cell has occurred.

In contrast, since for example, P-cell selection information is included in the neighboring cell list, the terminal 501 can specify a cell to be used as the P-cell and select the cell to be used as the P-cell, as the P-cell, by receiving the neighboring cell list.

For example, depending on the wireless channel quality threshold value, wireless channel quality, priority, measurement timing, and the value of penalty time, of each cell, a neighboring cell available only as the S-cell, instead of the base station in connection (e.g. a cell used as the P-cell), may be selected as the P-cell.

FIG. 7A is a diagram depicting an example of contention-based random access. In FIG. 7A, a case will be described where the terminal (UE) 501 selects the base station 511 that is a large cell, as the P-cell, and performs a contention-based random access procedure with respect to the selected base station 511. First, the terminal 501 transmits a random access preamble as a message 1 to the base station 511 (step S711).

The base station 511 then identifies the terminal 501 based on the random access preamble received at step S711 and configures a cell-radio network temporary identifier (C-RNTI) as an identifier of the terminal 501. The C-RNTI configured here is a temporary C-RNTI as a temporary identifier, for example.

The base station 511 configures, for the terminal 501, a UL grant, timing alignment information, a channel quality indicator (CQI) request, etc. The base station 511 then transmits a random access response including these configuration results and the random access preamble received at step S711, as a message 2, to the terminal 501 (step S712).

The terminal 501 then verifies whether the random access preamble transmitted at step S711 coincides with the random access preamble received at step S712. If not, the terminal 501 determines that the random access response received at step S712 is addressed to another terminal and again transmits the random access preamble. Here, the terminal 501 may transmit the most-recently transmitted random access preamble or select and transmit a different random access preamble.

If the random access preambles coincide, the terminal 501 recognizes that the random access response received at step S712 is addressed to the terminal 501. The terminal 501 then transmits a scheduled transmission including an RRC connection request, etc., as a message 3, to the base station 511 (step S713). The transmitting at step S713 is performed using the UL grant included in the random access response received at step S712 or using a wireless resource and a modulation scheme specified by the random access response.

The base station 511 transmits a contention resolution that is a response signal (ACK/NACK) to the scheduled transmission received at step S713, as a message 4 (step S714). This completes the wireless channel configuration between the terminal 501 and the base station 511.

FIG. 7B is a diagram depicting an example of non-contention-based random access. In FIG. 7B, a case will be described where the terminal (UE) 501 selects the base station 531 that is a small cell, as the S-cell, and performs a non-contention-based random access procedure with respect to the selected base station 531.

First, the base station 531 transmits a random access preamble assignment including a dedicated preamble, as a message 0, to the terminal 501 (step S721). The random access preamble assignment may include control information such as system information for allowing the base station 531 selected as the S-cell and the terminal 501 to execute a random access procedure.

The terminal 501 transmits a random access preamble as the message 1 to the base station 531 (step S722). The random access preamble transmitted at step S722 is a dedicated preamble included in the random access preamble assignment received at step S721.

The base station 531 transmits a random access response to the dedicated preamble received at step S722, as the message 2, to the terminal 501 (step S723). This terminates a series of non-contention-based random access procedure, configuring a channel between the terminal 501 and the base station 531. That is, the S-cell is added to the terminal 501 so that the carrier aggregation is configured therein.

The S-cell may be configured only through the downlink channel. The addition of the S-cell in this case is configured by allowing the P-cell to notify the terminal 501 of a request to add the S-cell (i.e. a request to receive the S-cell) and information for adding the S-cell (e.g. information on S-cell to be added (e.g. a cell ID, etc.) so that the notified terminal 501 receives the notified S-cell. As a result, the S-cell is added and the carrier aggregation is configured.

Figure 8A:
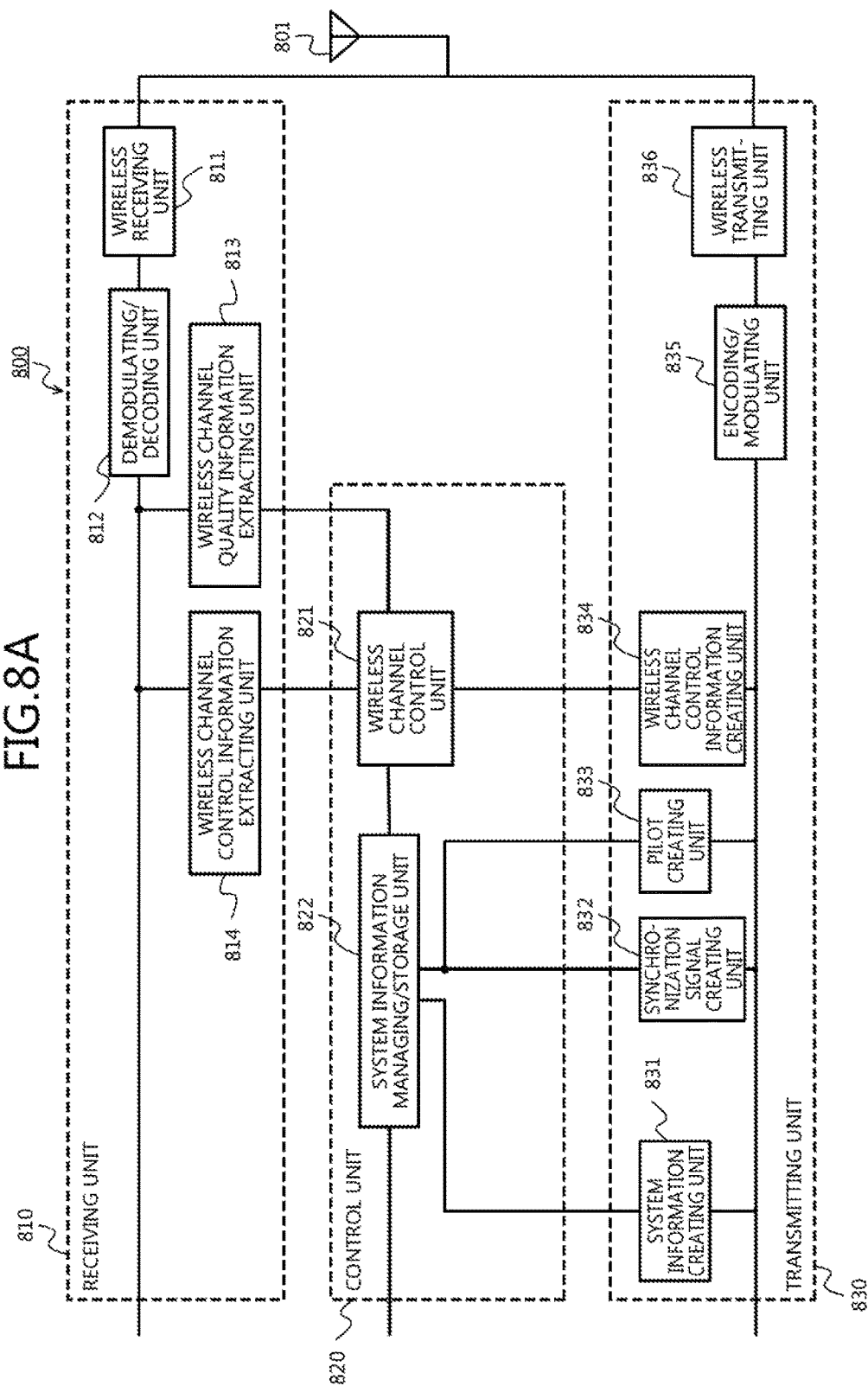
FIG. 8A is a diagram depicting an example of the base station.

FIG. 8A is a diagram depicting an example of the base station. FIG. 8B is a diagram depicting an example of signal flow in the base station depicted in FIG. 8A. Each of the base stations 511 and 531 to 538 may be implemented by a base station 800 depicted in FIGS. 8A and 8B for example. The base station 800 includes an antenna 801, a receiving unit 810, a control unit 820, and a transmitting unit 830. The receiving unit 810 includes a wireless receiving unit 811, a demodulating/decoding unit 812, a wireless channel quality information extracting unit 813, and a wireless channel control information extracting unit 814.

The control unit 820 includes a wireless channel control unit 821, and a system information managing/storage unit 822. The transmitting unit 830 includes a system information creating unit 831, a synchronization signal creating unit 832, a pilot creating unit 833, a wireless channel control information creating unit 834, a encoding/modulating unit 835, and a wireless transmitting unit 836.

The generating unit 111 depicted in FIGS. 1A to 1D may be implemented by the control unit 820, for example. The transmitting unit 112 depicted in FIGS. 1A to 1D may be implemented by the antenna 801 and the transmitting unit 830, for example.

The antenna 801 receives a signal transmitted by wireless from a terminal (e.g. the terminal 501) located in a cell of the base station 800 and outputs the received signal to the wireless receiving unit 811. The antenna 801 transmits a signal output from the wireless transmitting unit 836, wirelessly, to the terminal located in the cell of the base station 800.

The wireless receiving unit 811 performs reception processing of the signal output from the antenna 801. The reception processing in the wireless receiving unit 811 includes, e.g., amplification, frequency conversion from the high frequency band to the baseband, and conversion from an analog signal to a digital signal. The wireless receiving unit 811 outputs the reception-processed signal to the demodulating/decoding unit 812.

The demodulating/decoding unit 812 demodulates and decodes the signal output from the wireless receiving unit 811. The demodulating/decoding unit 812 then outputs reception data obtained by the demodulation and decoding. The reception data output from the demodulating/decoding unit 812 is output to a processing unit in the upper layer of the receiving unit 810, the wireless channel quality information extracting unit 813, and the wireless channel control information extracting unit 814.

The wireless channel quality information extracting unit 813 extracts wireless channel quality information included in the reception data output from the demodulating/decoding unit 812. The wireless channel quality information is for example the CQI, RSRP, and RSRQ. The wireless channel quality information extracting unit 813 outputs the extracted wireless channel quality information to the wireless channel control unit 821.

The wireless channel control information extracting unit 814 extracts wireless channel control information included in the reception data output from the demodulating/decoding unit 812. The wireless channel control information is, for example, a random access preamble, each random access message, and various response signals (ACK/NACK). The wireless channel control information extracting unit 814 outputs the extracted wireless channel control information to the wireless channel control unit 821.

The wireless channel control unit 821 performs control of the wireless channel in the base station 800. For the wireless channel control, for example, wireless channel quality information output from the wireless channel quality information extracting unit 813, wireless channel control information output from the wireless channel control information extracting unit 814, and system information (bandwidth or preamble) stored in the system information managing/storage unit 822 are used. The wireless channel control includes, for example, random access control and scheduling of the terminal (e.g., the base station 800), and measurement requests to terminals. For example, the wireless channel control unit 821 notifies the wireless channel control information creating unit 834 of wireless channel control information addressed to the terminal in accordance with the wireless channel control.

The system information managing/storage unit 822 performs the management and storage of system information. For example, the system information managing/storage unit 822 acquires and stores system information obtained by the wireless channel control of the wireless channel control unit 821, from the wireless channel control unit 821. The system information managing/storage unit 822 outputs to the wireless channel control unit 821, system information needed for the wireless channel control of the wireless channel control unit 821 among the stored system information.

The system information managing/storage unit 822 receives system information of a neighboring cell of the base station 800, as neighboring cell information, from the neighboring cell. The system information managing/storage unit 822 transmits system information of the base station 800, as neighboring information, to the neighboring cell of the base station 800.

The system information managing/storage unit 822 notifies the system information creating unit 831 of system information. The system information includes for example information (e.g., cell ID and bandwidth) related to the base station 800. The system information includes information (e.g., an available random access preamble) at the time of executing the random access procedure. The system information includes information (such as a cell priority and offset) related to the cell selection.

The system information includes the neighboring list described above. The neighboring list may be generated based on the neighboring cell information received from an neighboring cell and the cell information managed in the system information management/storage unit 822, for example.

For example, SIB4 includes definition of IntraFreqNeighCellList. This is a neighboring cell list for the same frequency as the base station (cell) being connected or waited for and the list includes cell IDs, etc. SIB5 includes definition of InterFreqNeighCellList. InterFreqNeighCellList is a neighboring cell list for frequencies different from the base station (cell) being connected or waited for and the list includes cell IDs, etc. InterFreqNeighCellList is included in InterFreqCarrierFreqInfo. The priority for cell reselection is included in InterFreqCarrierFregqInfo.

For example, IntraFreqNeighCellList and InterFreqNeighCellList described above include information indicating connect-ability as the P-cell and information indicating connect-ability as the S-cell (see, for example, FIGS. 15 to 17). IntraFreqNeighCellList and InterFreqNeighCellList described above may include information indicating whether a cell is in the hierarchical cell structure.

These types of system information are broadcasted as common control information by the base station 800 to the terminals within the cell of the base station 800, using the BCCH as the logical channel and using the PBCH or the PDSCH. When the system information includes a cell priority and offset used for the cell selection, the cell selection is carried out based on those types of information.

The system information managing/storage unit 822 outputs a cell ID of the base station 800 to the synchronization signal creating unit 832 and the pilot creating unit 833.

The transmitting unit 830 receives transmission data to be transmitted by the base station 800, from the processing unit in the upper layer of the transmitting unit 830. The transmission data received by the transmitting unit 830 is input to the encoding/modulating unit 835.

The system information creating unit 831 creates system information notified from the system information managing/storage unit 822 and maps the created system information to the broadcast channel, for output to the encoding/modulating unit 835.

The synchronization signal creating unit 832 creates a primary synchronization signal (PSS) (first synchronization signal) and a secondary synchronization signal (SSS) (second synchronization signal) that are synchronization signals based on the cell ID output from the system information managing/storage unit 822. The synchronization signal creating unit 832 then maps the created synchronization signals to the broadcast channel, for output to the encoding/modulating unit 835.

The pilot creating unit 833 creates a common pilot that is a pilot signal based on the cell ID output from the system information managing/storage unit 822 and, maps the created common pilot to a wireless frame, similar to the wireless control channel or the shared channel, for the output to the encoding/modulating unit 835. The pilot creating unit 833 may map the common pilot to a pilot channel and may map it to the wireless frame in the same manner.

The pilot created by the pilot creating unit 833 may include, for example, a cell specific pilot common to plural terminals in the cell. The pilot created by the pilot creating unit 833 may include a dedicated pilot (UE specific RS) allocated to individual terminals. The pilot created by the pilot creating unit 833 may include a pilot (positioning pilot or positioning RS) for position measurement. The pilot created by the pilot creating unit 833 may include a pilot (channel state information pilot or CSI-RS) for measuring the wireless channel quality. That is, the pilot created by the pilot creating unit 833 may be a known signal that is decided in advance between the base station 800 and the terminals or in the wireless communication system.

The wireless channel control information creating unit 834 creates wireless channel control information notified from the wireless channel control unit 821 and maps the created wireless channel control information to the broadcast channel or the shared channel, for the output to the encoding/modulating unit 835.

The encoding/modulating unit 835 performs encoding and modulation of input transmission data and each information (signals) output from the system information creating unit 831, the synchronization signal creating unit 832, the pilot creating unit 833, and the wireless channel control information creating unit 834. The encoding/modulating unit 835 then outputs the signal obtained by the encoding and modulation to the wireless transmitting unit 836.

The wireless transmitting unit 836 performs a transmitting process of the signal output from the encoding/modulating unit 835. The transmitting process at the wireless transmitting unit 836 includes, for example, conversion from a digital signal to an analog signal, frequency conversion from the baseband to the high-frequency band, and amplification. The wireless transmitting unit 836 outputs the signal obtained by the transmitting process to the antenna 801.

FIG. 8C is a diagram depicting an example of the hardware configuration of the base station. In FIG. 8C, parts similar to those depicted in FIGS. 8A and 8B are designated by the same reference numerals and will not again be described. The base station 800 depicted in FIGS. 8A and 8B may be implemented by a communication device 840 depicted in FIG. 8C for example. The communication device 840 includes an antenna 801, a large scale integration (LSI) 841, a digital signal processor (DSP) 842, a memory 843, and a communication interface (I/F) 844.

The LSI 841 is connected to the antenna 801 and the DSP 842. The wireless receiving unit 811 and the wireless transmitting unit 836 depicted in FIGS. 8A and 8B may be implemented by a circuit such as the LSI 841 for example.

The DSP 842 is connected to the LSI 841, the memory 843, and the communication interface 844. The DSP 842 provides overall control of the communication device 840. The memory 843 includes, for example, a main memory and an auxiliary memory. The main memory is a random access memory (RAM), for example. The main memory is used as a work area of the DSP 842. The auxiliary memory is a non-volatile memory such as a magnetic disk and a flash memory, for example. The auxiliary memory stores various programs operating the communication device 840. The programs stored in the auxiliary memory are loaded onto the main memory and executed by the DSP 842.

The communication interface 844 is an interface performing communication with an external communication device. The communication interface 844 may be, for example, a wired communication interface.

The demodulating/decoding unit 812, the wireless channel quality information extracting unit 813, the wireless channel control information extracting unit 814, the wireless channel control unit 821, and the system information managing/storage unit 822 depicted in FIGS. 8A and 8B may be implemented by a circuit such the DSP 842 and the memory 843, for example. The system information creating unit 831, the synchronization signal creating unit 832, the pilot creating unit 833, the wireless channel control information creating unit 834, and the encoding/modulating unit 835 depicted in FIGS. 8A and 8B may be implemented by a circuit such as the DSP 842 and the memory 843, for example. The interface for communication with a neighboring cell of the system information managing/storage unit 822 depicted in FIGS. 8A and 8B may be implemented by the communication interface 844, for example.

The DSP 842 may be replaced by a central processing unit (CPU) or by a combination of the DSP and the CPU.

Figure 9A:
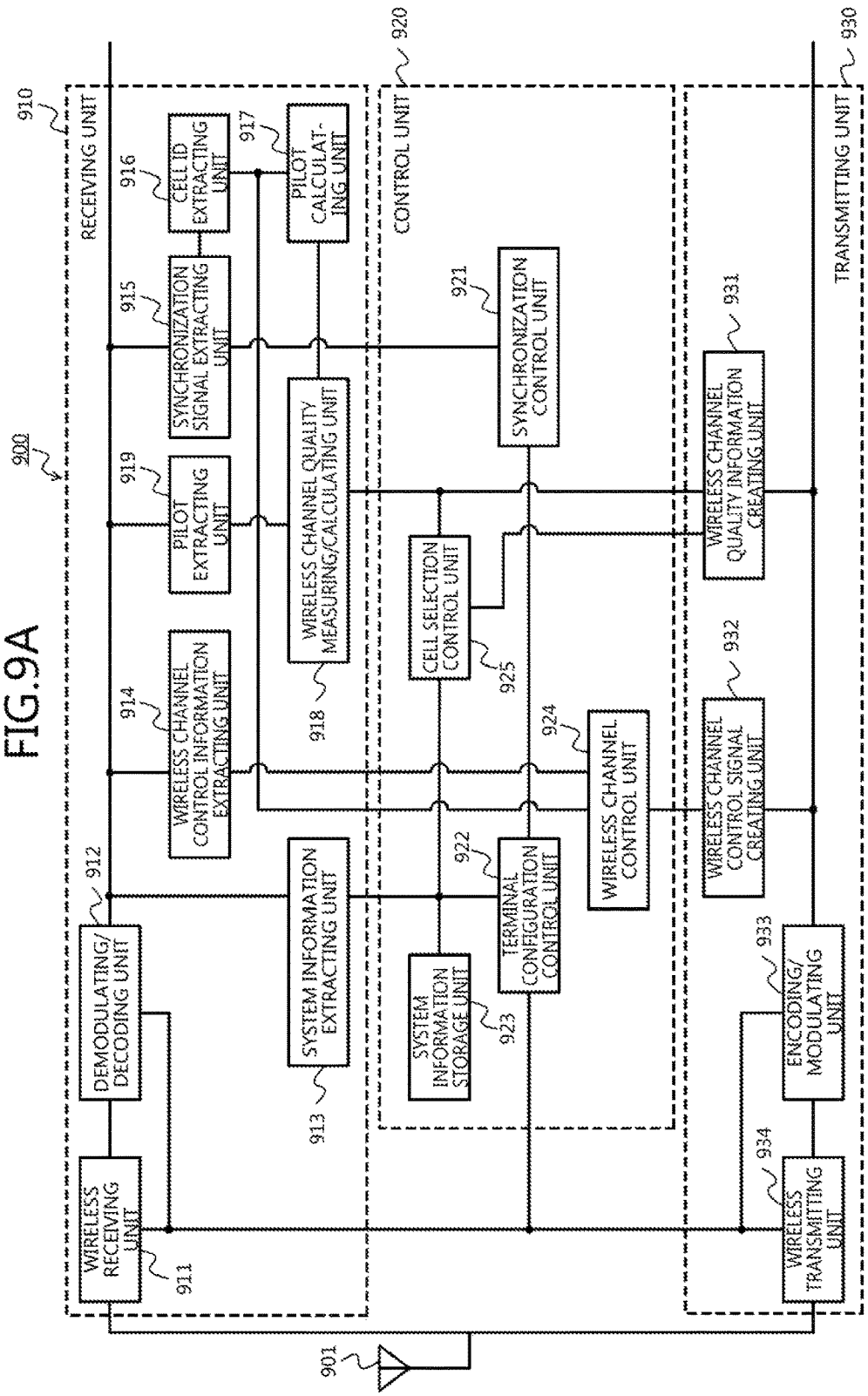
FIG. 9A is a diagram depicting an example of a terminal.
Figure 9B:
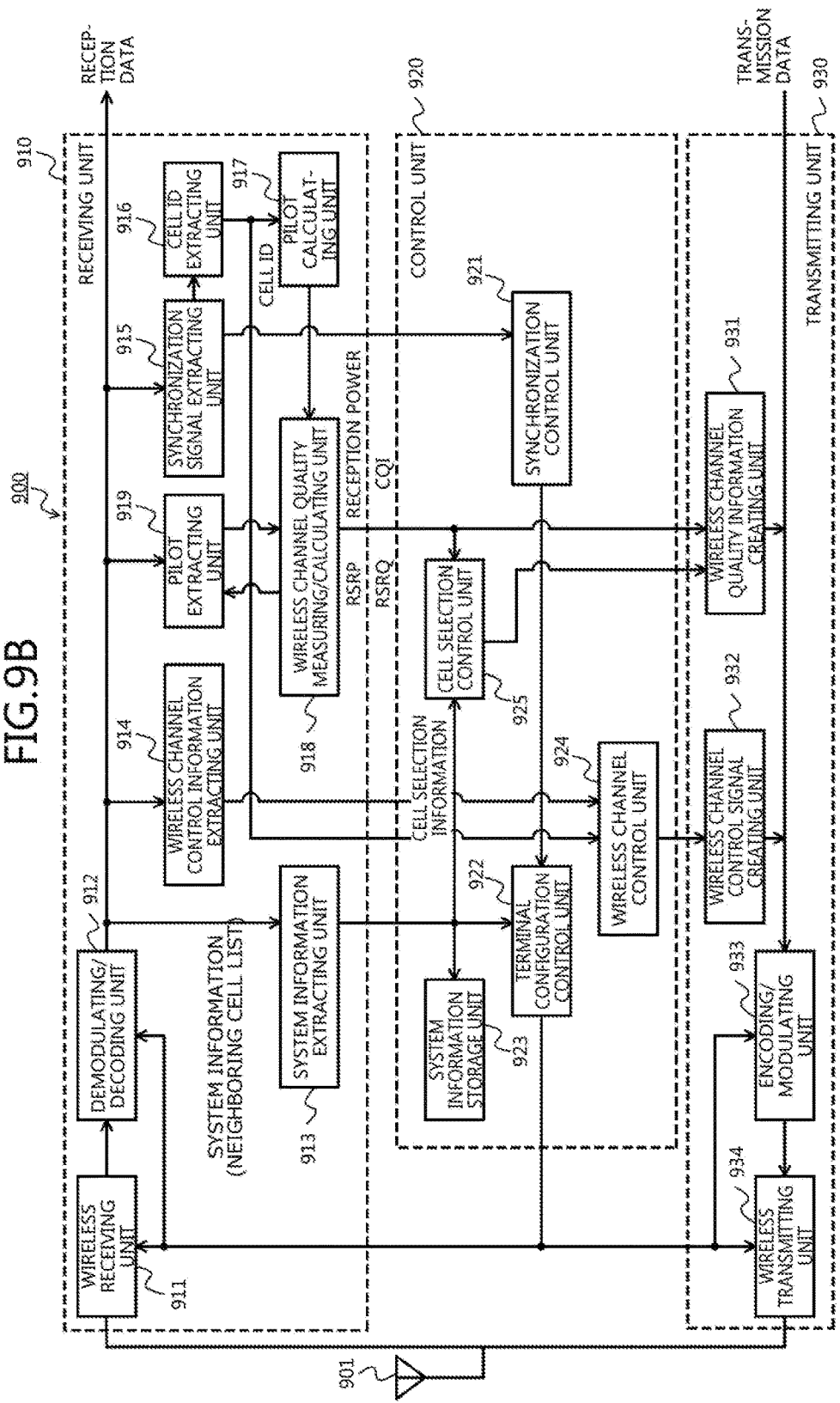
FIG. 9B is a diagram depicting an example of signal flow in the terminal depicted in FIG. 9A.

FIG. 9A is a diagram depicting an example of the terminal. FIG. 9B is a diagram depicting an example of signal flow in the terminal depicted in FIG. 9A. As depicted in FIGS. 9A and 9B, a terminal 900 includes an antenna 901, a receiving unit 910, a control unit, 920 and transmitting unit 930.

The receiving unit 910 includes a wireless receiving unit 911, a demodulating/decoding unit 912, a system information extracting unit 913, a wireless channel control information extracting unit 914, a synchronization signal extracting unit 915, and a cell ID extracting unit 916. The receiving unit 910 includes a pilot calculating unit 917, a wireless channel quality measuring/calculating unit 918, and a pilot extracting unit 919.

The control unit 920 includes a synchronization control unit 921, a terminal configuration control unit 922, a system information storage unit 923, a wireless channel control unit 924, and a cell selection control unit 925. The transmitting unit 930 includes a wireless channel quality information creating unit 931, a wireless channel control signal creating unit 932, an encoding/modulating unit 933, and a wireless transmitting unit 934.

The receiving unit 131 depicted in FIGS. 1A to 1D may be implemented by the antenna 901 and the receiving unit 910, for example. The control unit 132 depicted in FIGS. 1A to 1D may be implemented by the control unit 920, for example.

The antenna 901 receives a signal transmitted wirelessly from the base station (e.g. base station 511, 531, or 800) and outputs the received signal to the wireless receiving unit 911. The antenna 901 transmits wirelessly to the base station, a signal output from the wireless transmitting unit 934.

The wireless receiving unit 911 performs reception processing of the signal output from the antenna 901. The reception processing at the wireless receiving unit 911 includes, e.g., amplification, frequency conversion from the high frequency band to the baseband, and conversion from an analog signal to a digital signal. The wireless receiving unit 911 outputs the reception-processed signal to the demodulating/decoding unit 912.

The demodulating/decoding unit 912 demodulates and decodes the signal output from the wireless receiving unit 911. The demodulating/decoding unit 912 then outputs reception data obtained by the demodulation and decoding. The reception data output from the demodulating/decoding unit 912 is provided to a processing unit in the upper layer of the receiving unit 910, the system information extracting unit 913, the wireless channel control information extracting unit 914, the synchronization signal extracting unit 915, and the pilot extracting unit 919.

The system information extracting unit 913 extracts system information transmitted as broadcast information from the base station 800, included in the reception data imparted from the demodulating/decoding unit 912. The system information includes, for example, information related to the execution of the carrier aggregation, the neighboring cell list, etc. The system information extracting unit 913 outputs the extracted system information to the terminal configuration control unit 922, and the cell selection control unit 925.

In a case where the cell ID, frequency, and bandwidth of each cell subordinate to the base station 511, for example, are previously decided, the system information extracting unit 913 may store the extracted system information to the system information storage unit 923. In this case, the terminal 900 need not receive the system information later on in the large cell 521 of the base station 511. The system information may be stored in advance in the system information storage unit 923.

The wireless channel control information extracting unit 914 extracts wireless channel control information included in the reception data output from the demodulating/decoding unit 912 and outputs the extracted wireless channel control information to the wireless channel control unit 924. The wireless channel control information includes a random access response, a handover instruction, etc.

The synchronization signal extracting unit 915 extracts the PSS and the SSS that are synchronization signals included in the reception data output from the demodulating/decoding unit 912. The synchronization signal extracting unit 915 outputs the PSS and SSS extraction results to the cell ID extracting unit 916 and the synchronization control unit 921.

The cell ID extracting unit 916 extracts a cell ID of the PSS and SSS transmitter cell, based on the extraction results output from the synchronization signal extracting unit 915. The cell ID extracting unit 916 then outputs the extracted cell ID to the pilot calculating unit 917 and the wireless channel control unit 924.

The pilot calculating unit 917 calculates a pilot pattern based on the cell ID output from the cell ID extracting unit 916. The pilot calculating unit then notifies the wireless channel quality measuring/calculating unit 918 of the calculated pilot pattern.

The wireless channel quality measuring/calculating unit 918 controls the pilot extracting unit 919 so as to extract a pilot of the pattern notified from the pilot calculating unit 917. The wireless channel quality measuring/calculating unit 918 then measures the wireless channel quality based on the pilot output from the pilot extracting unit 919 and calculates wireless channel quality information based on the measurement result. The wireless channel quality measuring/calculating unit 918 outputs the calculated wireless channel quality information to the cell selection control unit 925 and the wireless channel quality information creating unit 931. The wireless channel quality information is, for example, the CQI, RSRP, RSRQ, etc.

The synchronization control unit 921 is synchronized with the pilot transmitter base station, based on the extraction result output from the synchronization signal extracting unit 915. The synchronization is, for example, synchronization of wireless frames such as matching the timing of the frame heads, synchronization of slots making up the wireless frame, or synchronization of symbols (wireless signals) making up the slot. One wireless frame is made up of 20 slots or 10 subframes with one subframe consisting of 2 slots.

The synchronization control unit 921 provides synchronization control for controlling the reception or transmitting timing of the terminal 900, based on the synchronized timing. For example, the synchronization control unit 921 notifies the terminal configuration control unit 922 of the timing synchronized with the base station.

The terminal configuration control unit 922 provides control of the wireless receiving unit 911, the demodulating/decoding unit 912, the encoding/modulating unit 933, and the wireless transmitting unit 934, based on the timing notified from the synchronization control unit 921. The control by the terminal configuration control unit 922 uses system information output from the system information extracting unit 913 and the system information stored in the system information storage unit 923. The control by the terminal configuration control unit 922 includes control related to the carrier aggregation, etc.

The wireless channel control unit 924 performs control of the wireless channel of the terminal 900. The wireless channel control of the terminal 900 includes, for example, the random access procedure and the handover procedure. The wireless channel control of the terminal 900 is performed based on, for example, the cell ID output from the cell ID extracting unit 916 or the wireless channel control information output from the wireless channel control information extracting unit 914. The wireless channel control unit 924 notifies the wireless channel control signal creating unit 932 of wireless channel control information in accordance with the wireless channel control.

The cell selection control unit 925 performs selection of a P-cell and an S-cell to which the terminal 900 is connected. The cell selection by the cell selection control unit 925 is performed based on, for example, the wireless channel quality information output from the wireless channel quality measuring/calculating unit 918, the system information output from the system information extracting unit 913, or the cell selection information stored in the system information storage unit 923. This system information includes the neighboring cell list. The cell selection control unit 925 notifies the wireless channel quality information creating unit 931 of the selected cell.

For example, in the case of selecting a P-cell to which the terminal 900 is to be connected, the cell selection control unit 925 selects a cell connectable as the P-cell, based on the neighboring cell list included in the system information output from the system information extracting unit 913.

In the case of selecting an S-cell to which the terminal 900 is to be connected, the cell selection control unit 925 selects a cell connectable as the S-cell, based on the neighboring cell list included in the system information output from the system information extracting unit 913. However, in a case where the base station 800 selects an S-cell to which the terminal 900 is to be connected, the cell selection control unit 925 selects an S-cell specified by the system information.

The transmitting unit 930 receives from the processing unit in the upper layer of the transmitting unit 930, transmission data to be transmitted by the terminal 900. The transmission data input to the transmitting unit 930 is input to the encoding/modulating unit 933.

The wireless channel quality information creating unit 931 creates wireless channel quality information based on the wireless channel quality information output from the wireless channel quality measuring/calculating unit 918 and on the cell notified from the cell selection control unit 925. The wireless channel quality information creating unit 931 then maps the created wireless channel quality information to the control channel and outputs the result to the encoding/modulating unit 933.

The wireless channel control signal creating unit 932 creates wireless channel control information notified from the wireless channel control unit 924, maps the created wireless channel control information to the control channel, and outputs the result to the encoding/modulating unit 933.

The encoding/modulating unit 933 performs encoding and modulation of input transmission data and each information (signals) output from the wireless channel quality information creating unit 931 and the wireless channel control signal creating unit 932. The encoding/modulating unit 933 then outputs to the wireless transmitting unit 934, a signal obtained by the encoding and modulation.

The wireless transmitting unit 934 performs a transmitting process on the signal output from the encoding/modulating unit 933. The transmitting process at the wireless transmitting unit 934 includes, for example, conversion from a digital signal to an analog signal, frequency conversion from the baseband to the high-frequency band, and amplification. The wireless transmitting unit 934 outputs the signal obtained by the transmitting process to the antenna 901.

FIG. 9C is a diagram depicting an example of hardware configuration of the terminal. In FIG. 9C, parts similar to those depicted in FIGS. 9A and 9B are designated by the same reference numerals used in FIGS. 9A and 9B and will not again be described. The terminal 900 depicted in FIGS. 9A and 9B may be implemented by a communication device 940 depicted in FIG. 9C, for example. The communication device 940 includes an antenna 901, an LSI 941, a DSP 942, a memory 943, a display unit 944, a microphone 945, and a loudspeaker 946.

The LSI 941 is connected to the antenna 901 and the DSP 942. The wireless receiving unit 911 and the wireless transmitting unit 934 depicted in FIGS. 9A and 9B may be implemented by a circuit such as the LSI 941, for example.

The DSP 942 is connected to the LSI 941 and the memory 943. The DSP 942 provides control of the entire communication device 940. The memory 943 includes, for example, a main memory and an auxiliary memory. The main memory is the RAM, for example. The main memory is used as a work area of the DSP 942. The auxiliary memory is a non-volatile memory such as a magnetic disk and a flash memory, for example. The auxiliary memory stores various programs operating the communication device 940. The programs stored in the auxiliary memory are loaded onto the main memory and executed by the DSP 942.

A circuit such the DSP 942 and the memory 943, for example, may implement the demodulating/decoding unit 912, the system information extracting unit 913, the wireless channel control information extracting unit 914, the synchronization signal extracting unit 915, and the cell ID extracting unit 916 depicted in FIGS. 9A and 9B. A circuit such as the DSP 942 and the memory 943, for example, may implement the pilot calculating unit 917, the wireless channel quality measuring/calculating unit 918, and the pilot extracting unit 919 depicted in FIGS. 9A and 9B.

A circuit such as the DSP 942 and the memory 943, for example, may implement the synchronization control unit 921, the terminal configuration control unit 922, the system information storage unit 923, the wireless channel control unit 924, and the cell selection control unit 925 depicted in FIGS. 9A and 9B. A circuit such as the DSP 942 and the memory 943, for example, may implement the wireless channel quality information creating unit 931, the wireless channel control signal creating unit 932, and the encoding/modulating unit 933 depicted in FIGS. 9A and 9B. The DSP 942 may be replaced by a CPU or by a combination of the DSP and the CPU.

The display unit 944, the microphone 945, and the loudspeaker 946 are user interfaces of the user of the communication device 940. The display unit 944 may be a device functioning also as an input device, such as a touch panel, for example.

The synchronization such as frame synchronization and slot synchronization and the cell ID will be described. The PSS and SSS as synchronization signals of the LTE system are created on the basis of the cell ID. A total of 504 cell IDs are defined with 168 groups each consisting of three cell IDs. $N_{ID}(1)$ indicative of a group is an integer value from 0 to 167 and $N_{ID}(2)$ indicative of an element of a group is an integer value from 0 to 2. The cell ID is expressed, for example, as $N_{ID}(\text{cell})=3N_{ID}(1)+N_{ID}(2)$.

Here, $N_{ID}(\text{cell})$ represents a cell ID; $N_{ID}(1)$ represents 168 types of groups (cell groups); and $N_{ID}(2)$ represents three different identifiers. This enables 504 types of cell IDs to be represented. In the LTE or the LTE-Advanced, the PSS is correlated with the SSS so that a cell ID may be specified by specifying the PSS and the SSS.

The PSS (root sequence) will be described. The PSS is a 62-bit signal sequence. The PSS is created by using Zadoff-Chu sequence of the frequency range and may be expressed by formula (6) below, for example.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (6)$$

Here, a root index u is correlated with the cell group identifier $N_{ID}(2)$. The root index u indicates an index of the Zadoff-Chu root sequence, with three different root indexes u being defined in advance. The terminal 900 performs blind-estimation of the PSS so that the $N_{ID}(2)$ may be specified from the detected sequence.

It can therefore be seen that three signal sequences are formed as the PSS. That is, in the case of executing the synchronization using the PSS, three signal sequences may be prepared in advance so that coincident signal sequences may be found. For example, the terminal 900 confirms the correlation between the signal sequence of the received PSS and the above-described three signal sequences to select a most highly correlated, i.e., most likely signal sequence.

In addition, the PSS is transmitted with slots #0 and #10 among 10 subframes (subframes #0 to #9) and 20 slots (slots #0 to #19) making up the wireless frame. Thus, the slot detecting the PSS is either the slot #0 or #10. Based on this, the beginning of the slot #0 or 10 may be calculated so that the slot synchronization may be carried out. The beginnings of the subframe #0 including the slot #0 and of the subframe #5 including the slot #10 may be calculated so that the subframe synchronization may be carried out. Furthermore, since the slot #0 is the beginning of the wireless frame, the frame synchronization may be carried out.

The SSS will be described. The SSS is a 62-bit signal sequence, similar to the PSS, and may be expressed by formula (7) below. The SSS is of a structure having an interleaved 31-long binary sequence and is scrambled using a scrambling sequence $(C_0(n), C_1(n))$ given in the PSS, with $0 \le n \le 30$.

$$d(2n) = \begin{cases} s_0(m_0)(n)c_0(n) & \text{in subframe 0} \\ s_1(m_1)(n)c_0(n) & \text{in subframe 5} \end{cases} \quad (7)$$

-continued
$$d(2n+1) = \begin{cases} s_1(m_1)(n)c_1(n)z_1(m_0)(n) & \text{in subframe 0} \\ s_0(m_0)(n)c_1(n)z_1(m_1)(n) & \text{in subframe 5} \end{cases}$$

$m_0$ and $m_1$ are correlated with $N_{ID}(1)$ and may be expressed by formula (8) below.

$$m_0 = m' \bmod 31 \quad (8)$$
$$m_1 = (m_0 + \lfloor m'/31 \rfloor + 1) \bmod 31$$
$$m' = N_{ID}(1) + q(q+1)/2, \, q = \left\lfloor \frac{N_{ID}(1) + q'(q'+1)/2}{30} \right\rfloor,$$
$$q' = \lfloor N_{ID}(1)/30 \rfloor$$

The relationship between $m_0$, $m_1$, and $N_{ID}(1)$ in formula (8) is previously defined in the system. $s_0(m_0)(n)$ and $s_1(m_1)(n)$ are created by cyclically shifting an m-sequence $\hat{s}(n)$. That is, $s_0(m_0)(n)$ and $s_1(m_1)(n)$ may be expressed by formula (9) below.

$$\begin{aligned} s_0(m_0)(n) &= \hat{s}((n+m_0) \bmod 31) \\ s_1(m_1)(n) &= \hat{s}((n+m_1) \bmod 31) \end{aligned} \quad \hat{s}(i) = 1 - 2 \times (i) \, 0 \le i \le 30 \quad (9)$$

The m-sequence $\hat{s}(n)$ may be expressed by equation (10) below.

$$x(\bar{i}+5) = (x(\bar{i}+2) + x(\bar{i})) \bmod 2$$
$$0 \le \bar{i} \le 25, x(0)=0, x(1)=0, x(2)=0, x(3)=0, x(4)=1 \quad (10)$$

In the initial state, $x(0)=0$, $x(1)=0$, $x(2)=0$, $x(3)=0$, and $x(4)=1$ are given.

$c_0(n)$ and $c_1(n)$ will be described. $c_0(n)$ and $c_1(n)$ are scrambling sequences that depend on the PSS and are expressed as cyclically shifting the m-sequence $\hat{s}(n)$. That is, $c_0(n)$ and $c_1(n)$ may be expressed by formula (11) below, for example.

$$\begin{aligned} c_0(n) &= \hat{c}((n+N_{ID}(2)) \bmod 31) \\ c_1(n) &= \hat{c}((n+N_{ID}(2)+3) \bmod 31) \end{aligned} \quad \hat{c}(i) = 1 - 2 \times (i) \, 0 \le i \le 30 \quad (11)$$

$\hat{c}(n)$ is expressed as $\hat{c}(i)=1-2\times(i)$, similar to the m-sequence $\hat{s}(n)$, but it differs from the m-sequence $\hat{s}(n)$ in that $x(i)$ is given as formula (12) below.

$$x(\bar{i}+5) = (x(\bar{i}+3) + x(\bar{i})) \bmod 2 \quad 0 \le \bar{i} \le 25 \quad (12)$$

$z_1(m_0)(n)$ and $z_1(m_1)(n)$ will be described. $z_1(m_0)(n)$ and $z_1(m_1)(n)$ are also created by cyclically shifting the m-sequence $\hat{s}(n)$ and may be expressed by formula (13) below, for example.

$$z_1(m_0)(n) = \hat{z}((n+(m_0 \bmod 8)) \bmod 31)$$
$$z_1(m_1)(n) = \hat{z}((n+(m_1 \bmod 8)) \bmod 31)$$
$$\hat{z}(i) = 1 - 2 \times (i), 0 \le i \le 30 \quad (13)$$

$\hat{z}(n)$ is expressed as $\hat{z}(i)=1-2\times(i)$, similar to the m-sequence $\hat{s}(n)$, but it differs from the m-sequence $\hat{s}(n)$ in that $x(i)$ is given as formula (14) below.

$$x(\bar{i}+5) = (x(\bar{i}+4) + x(\bar{i}+2) + x(\bar{i}+1) + x(\bar{i})) \bmod 2, \, 0 \le \bar{i} \le 25 \, x(0)$$
$$=0, x(1)=0, \, x(2)=0, x(3)=0, x(4)=1 \quad (14)$$

Since the SSS creation mechanism (such as m-sequence or PSS-based scrambling) is known at the terminal 900, $m_0$ and $m_1$ are specified based on such information so as to be able to derive $N_{ID}(1)$. $N_{ID}$(cell) may be derived based on $N_{ID}(1)$ and $N_{ID}(2)$.

The terminal 900 receiving the SSS divides even numbers (d(2n)) of the received SSS by $c_0(n)$ and $c_1(n)$ calculated from $N_{ID}(2)$ obtained for the PSS, to thereby find $s_0(m_0)$ (n) and $s_1(m_1)$ (n) as received signals.

The terminal calculates the correlation between $s_0(m_0)$ (n) and $s_1(m_1)$ (n) created from the specified $m_0$ and $m_1$, to derive $m_0$ and $m_1$ of the received SSS to obtain $N_{ID}(1)$. As a result, the cell ID may be calculated. The cell-ID-based slot synchronization and frame synchronization also become feasible.

When the slot synchronization (or the frame synchronization) is established and $N_{ID}$(cell) is found as the cell ID, the pilot signal to be transmitted by the neighboring base station can also be derived. The pilot signal sequence in the LTE is calculated by expressions (15) to (17) which follow.

$$\eta_{l,n_s}(m) = \frac{1}{\sqrt{2}}(1 - 2 \cdot c(2m)) + j\frac{1}{\sqrt{2}}(1 - 2 \cdot c(2m+1)), \quad (15)$$

$$m = 0, 1, \ldots, 2N_{RB}(\max, DL) - 1$$

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad (16)$$

$$N_C = 1600, x_1(0) = 1, x_1(n) = 0, n = 1, 2, \ldots, 30$$

$$c_{init} = 2^{10} \cdot (7 \cdot (n_s+1) + l + 1) \cdot (2 \cdot N_{ID}(\text{cell}) + 1) + 2 \cdot N_{ID}(\text{cell}) + N_{CP} c_{int} \quad (17)$$

$n_s$ denotes a slot number. The slot number may be identified by establishing the slot synchronization. I denotes an OFDM symbol number in the slot. As for the OFDM symbol number, the arrangement of the pilot signals along the axis of time is defined in advance. c(i) denotes a pseudo-random signal sequence (pseudo-random noise (PN)).

$N_{CP}$ is a normal CP or an extended CP. The extended CP is used when executing a large cell or multicast-broadcast single frequency network (MBSFN) transmission and has less time than the normal CP.

In this manner, if the ID is found, the pilot signal sequence may be calculated. Thus, the terminal 900 receiving the pilot signal sequence compares the received pilot signal sequence with a pilot signal sequence created from the cell ID calculated as a result of reception of the synchronization signal, thereby enabling synchronization in units of OFDM-symbol (hereinafter, simply "symbol").

FIG. 10 is a flowchart depicting an example of a P-cell connection process by the terminal. The terminal 900 executes steps depicted in FIG. 10, for example, as the P-cell connection process. To execute connection to or to wait for (camp on) a certain base station, the terminal 900 first measures wireless channel quality from nearby base stations and selects the cell having the best result (step S1001).

At step S1001, for example, the terminal 900 measures reception power and selects the cell having the highest reception power. This reception power may be reception power based on a certain signal (e.g., pilot) such as a received signal strength indicator (RSSI), for example. This reception power may be reception power based on envelope detection, for example.

Subsequently, the terminal 900 synchronizes with the cell selected at step S1001 (step S1002). The terminal 900 receives the system information including the neighboring cell list from the cell synchronized at step S1002 (step S1003). As described above, the neighboring cell list includes information indicating whether each of the neighboring cells is selectable as the P-cell and information indicating whether each of the neighboring cells is selectable as the S-cell.

The system information received at step S1003 may include information indicating whether the cell synchronized at step S1002 is selectable as the P-cell and information indicating whether the synchronized cell is selectable as the S-cell, in addition to the neighboring cell list. As a result, the information indicating whether selectable as the P-cell and the information indicating whether selectable as the S-cell may be acquired for each of the cell synchronized at step S1002 and the neighboring cells of the cell synchronized at step S1002.

The terminal 900 initializes n (n=1) (step S1004). It is noted that n is a variable for storing an index of connection candidate cells. The connection candidate cells are, for example, cells including the cell synchronized at step S1002 and the neighboring cells of the cell synchronized at step S1002. The connection candidate cells may be identified from the system information including the neighboring cell list received at step S1003, for example.

Subsequently, the terminal 900 synchronizes with a cell n (step S1005). The terminal 900 determines whether the cell n synchronized at step S1005 is a cell connectable as the P-cell, based on the system information including the neighboring cell list received at step S1003 (step S1006). If the cell n is not a cell connectable as the P-cell (step S1006: NO), the terminal 900 goes to step S1009.

If connectable as the P-cell at step S1006 (step S1006: YES), the terminal 900 measures wireless channel quality of the cell n (step S1007). The wireless channel quality measured at step S1007 is the RSRQ, RSRP, etc., for example.

The terminal 900 calculates a reception quality evaluation result for the cell n based on the wireless channel quality measured at step S1007 (step S1008). The reception quality evaluation result may be calculated by using the adjustment information such as the priority of the cell n. The information such as the priority of the cell n may be included in the system information received at step S1003, for example. Alternatively, the information such as the priority of the cell n may be received from the cell n after step S1005, for example.

The terminal 900 increments n to n=n+1 (step S1009). The terminal 900 determines whether n is greater than K (step S1010). K is the number of connection candidate cells of the terminal 900. If not (step S1010: NO), the terminal 900 returns to step S1005.

If greater at step S1010 (step S1010: YES), the terminal 900 selects a connection cell, from among cells determined to be cells connectable as the P-cell at step S1006 (step S1011). The selection of the connection cell is performed based on the result of comparison of the reception quality evaluation results calculated at step S1008, for example.

The terminal 900 executes a channel connection such as random access to the cell selected at step S1011 (step S1012), to terminate a series of P-cell connection process steps. Since the channel connection at step S1012 is connection to the P-cell, it is performed by contention-based random access (see, e.g., FIG. 7A), for example.

For example, the terminal 900 is again synchronized with the cell selected at step S1011 and receives system information related to channel connection from the selected cell. This system information includes, for example, a set of available random access preambles, a transmitting format of the random access preamble, transmitting timing of the random access preamble, and an initial value of the transmission power of the random access preamble. In the LTE system, these types of information are included in SIB2 defined in TS36.331 of the 3GPP, for example.

The terminal 900 starts the contention-based random access procedure depicted in FIG. 7A, for example, based on information for channel connection included in the SIB2. Here, the random access preamble is used as information for identifying the terminal 900. For the contention-based random access procedure, the terminal 900 may use configuration information of a random access channel (RACH) or a physical RACH (PRACH).

In the example depicted in FIG. 10, for example, the steps S1005 and S1006 may be executed in reverse order. As a result, a cell not connectable as the P-cell may be excluded from the synchronization. Additionally, for example, if wireless channel quality is measured at step S1007 without synchronization with the cell n (e.g., wireless channel quality based on envelope detection), step S1005 may be omitted.

As described above, by using the neighboring cell list including information indicating whether the neighboring cells are connectable as the P-cell, for example, selection and connection of a cell not connectable as the P-cell may be prevented so as to select and connect a cell optimum for the P-cell. This optimum cell may be the base station having the highest reception power or the cell having the best reception signal quality. Alternatively, the optimum cell may be selected with consideration of both the reception power and the reception signal quality.

For example, as depicted in FIG. 10, by using the neighboring cell list including information indicating whether the neighboring cells are connectable as the P-cell, a cell not connectable as the P-cell may be excluded from the measurement of the wireless channel quality. As a result, the measurement of the wireless channel quality may be made more efficient. For example, the amount of processing for measurement and calculation may be reduced; and the amount of processing for selection may be reduced by reducing the number of cells subject to the selection processing. As a result, for example, a reduction in the time consumed for cell selection and an improvement in transmission speed, etc. may be achieved.

FIG. 11 is a flowchart depicting an example of an S-cell connection process by the terminal. The terminal 900 executes steps depicted in FIG. 10, for example, as the S-cell connection process, while being connected to the P-cell (e.g., base station 511) by the P-cell connection process depicted in FIG. 11, for example.

The terminal 900 first receives, from the P-cell, cell information of a neighboring cell of the P-cell (step S1101). The neighboring cell of the P-cell is a candidate cell of the S-cell of the terminal 900. The cell information may include system information such as the frequency, bandwidth, and cell ID of each of small cells subordinate to the P-cell, for example.

The terminal 900 receives a wireless channel quality measurement request requesting the measurement of the wireless channel quality, from the P-cell (step S1102). In a case where the terminal 900 periodically measures the wireless channel quality, the step S1102 may be excluded from the process.

The terminal 900 initializes n (n=1) (step S1103). n is a variable storing an index of a connection candidate cell indicated by the cell information received at step S1101. The terminal 900 is synchronized with a cell n (step S1104). The synchronization at step S1104 may be performed based on the frequency, bandwidth, cell ID, etc. included in the cell information received at step S1101, for example.

Subsequently, the terminal 900 determines whether the cell n synchronized at step S1104 is a cell connectable as the S-cell (step S1105). The determination at step S1105 may be made based on the system information including the neighboring cell list received at step S1003 depicted in FIG. 10, for example. If the cell n is not a cell connectable as the S-cell (step S1105: NO), the terminal 900 goes to step S1108.

If connectable as an S-cell at step S1105 (step S1105: YES), the terminal 900 measures wireless channel quality of the cell n (step S1106). The wireless channel quality measured at step S1106 is the RSRQ, RSRP, etc., for example. The measurement of the wireless channel quality at step S1106 may be performed based on the frequency, bandwidth, cell ID, etc. included in the cell information received at step S1101, for example. The terminal 900 transmits the result of the wireless channel quality measurement at step S1106 to the P-cell in connection (step S1107).

The terminal 900 increments n (n=n+1) (step S1108). The terminal 900 determines whether n is greater than K (step S1109). K is the number of the connection candidate cells of the terminal 900 indicated by the cell information received at step S1101. If n is not greater than K (step S1109: NO), the terminal 900 returns to step S1104.

If n is greater than K at step S1109 (step S1109: YES), the terminal 900 receives an S-cell addition request from the P-cell (step S1110). The S-cell addition request is a control signal requesting the terminal 900 to add, as the S-cell, a cell selected by the P-cell based on the measurement result transmitted at step S1107.

The terminal 900 executes a channel connection such as random access based on the S-cell addition request received at step S1110 (step S1111), to end a series of S-cell connection process steps. Since the channel connection at step S1111 is a connection to the S-cell, the non-contention-based random access is performed (see, FIG. 7B) for example.

For example, the S-cell addition request includes a dedicated preamble for non-contention-based random access utilizable in the S-cell at the connection destination. The terminal 900 can perform the non-contention-based random access by using the dedicated preamble included in the S-cell addition request, thereby connecting to the S-cell selected by the P-cell.

FIG. 12 is a flowchart depicting an example of the S-cell selection process by the base station (P-cell). The base station 800 (e.g., base station 511), to which the terminal 900 is connected as the P-cell, performs steps depicted in FIG. 12, for example, as the S-cell selection process for the terminal 900.

The base station 800 first transmits cell information of a neighboring cell (e.g., a cell of the base station 531), to the terminal 900 (step S1201). The base station 800 transmits a wireless channel quality measurement request requesting measurement of the wireless channel quality to the terminal 900 (step S1202). In a case where the terminal 900 periodically measures the wireless channel quality, the step S1202 may be excluded from the process. The base station 800 receives the wireless channel quality measurement result transmitted from the terminal 900 at step S1107 depicted in FIG. 11, for example (step S1203).

Subsequently, the base station 800 calculates a reception quality evaluation result based on the measurement result received at step S1203 (step S1204). The reception quality evaluation result is calculated by using the priority, offset, etc. of cells included in the neighboring cell information, for example.

The base station 800 selects a cell to be connected by the terminal 900, from among cells connectable as the S-cell by the terminal 900 (step S1205). The selection of the connection cell is performed based on, for example, the result of comparison of the reception quality evaluation results calculated at step S1204. For example, the base station 800 selects, as the connection cell, either a cell with a highest reception quality evaluation result or a cell with a reception quality evaluation result greater than or equal to the threshold value.

The base station 800 transmits a connection information request requesting connection information for the connection of the terminal 900 thereto, to the cell (e.g., base station 531) selected at step S1205 (step S1206). The connection information includes a dedicated preamble for the non-contention-based random access, for example. This dedicated preamble is a random access preamble usable by only a specific terminal during a specific period and is also called a dedicated random access preamble.

The base station 800 receives connection information from the cell selected at step S1205, in response to the connection information request transmitted at step S1206 (step S1207). The base station 800 transmits to the terminal 900, an S-cell addition request including connection information such as the dedicated preamble received at step S1207 and requesting the addition of an S-cell thereto (step S1208), to terminate a series of S-cell selection process steps.

The cell connectable as the S-cell include a cell having only a downlink without configuration of an uplink. Since uplink transmission is impossible, random access cannot be performed to the cell having only a downlink. In this case, link connection is achieved by additionally configuring a downlink without performing random access.

FIG. 13 is a flowchart depicting a variant of the S-cell connection process by the terminal. The terminal 900 may execute steps depicted in FIG. 13, for example, as the S-cell connection process, while being connected to the P-cell by the P-cell connection process depicted in FIG. 10 for example.

The terminal 900 first receives cell information based on the S-cell selection information from the P-cell (step S1301). The cell information based on the S-cell selection information is information indicating a cell that is a neighboring cell of the P-cell and that is connectable as the S-cell.

Steps S1302 to S1304 depicted in FIG. 13 are similar to the steps S1102 to S1104 depicted in FIG. 11. Subsequent to the step S1304, the terminal 900 measures the wireless channel quality of the cell n (step S1305). The wireless channel quality measured at step S1305 is, for example, the RSRQ, RSRP, etc. Steps S1306 to S1310 depicted in FIG. 13 are similar to the steps S1107 to S1111 depicted in FIG. 11.

As described above, by receiving the S-cell information indicating cells connectable as the S-cell, the terminal 900 may measure the wireless channel quality with respect only to the cells connectable as the S-cell so as to select the S-cell, without determining whether the cells are connectable as the S-cell.

FIG. 14 is a flowchart depicting a variant of the S-cell selection process by the base station (P-cell). In a case where the terminal 900 performs the S-cell connection process depicted in FIG. 13, the base station 800 as the P-cell connected by the terminal 900 executes steps depicted in FIG. 14, for example, as the S-cell selection process for the terminal 900.

First, the base station 800 transmits the S-cell information to the terminal 900 (step S1401). The S-cell information is information indicating cells connectable as the S-cell among the neighboring cells of the base station 800. The S-cell information may be generated based on the neighboring cell information that the base station 800 receives from the neighboring cells, for example. Steps S1402 to S1408 depicted in FIG. 14 are the same as steps S1202 to S1208 depicted in FIG. 12.

As depicted in FIGS. 13 and 14, the notification of cells connectable as the S-cell may be made from the base station 800 to the terminal 900. As a result, the terminal 900 can measure the wireless channel quality with respect only to the cells connectable as the S-cell so as to select the S-cell, without determining whether the cells are connectable as the S-cell.

A cell unconnectable as the S-cell may be notified from the base station 800 to the terminal 900. In this case, the terminal 900 excludes the cell unconnectable as the S-cell notified from the base station 800, from measurement of the wireless channel quality.

FIG. 15 is a diagram of an example of the neighboring cell list. For example, an neighboring cell list 1500 depicted in FIG. 15 may be used for the neighboring cell list included in the system information and broadcasted by the base station 800. The neighboring cell list 1500 includes "cell ID," "CA execution," "HCS execution," "connection as P-cell," and "connection as S-cell." It is noted that "description" is depicted for convenience of description and may be omitted from the neighboring cell list 1500.

The "cell ID" is identification information of an object neighboring cell.

The "CA execution" is information indicating whether carrier aggregation is executed in an object neighboring cell. In the example depicted in FIG. 15, the "CA execution" set to "1" indicates that carrier aggregation is executed, and the "CA execution" set to "0" indicates that carrier aggregation is not executed (unexecuted).

The "HCS execution" is information indicating whether communication through hierarchical cell structure (HCS) is executed in an object neighboring cell. In the example depicted in FIG. 15, the "HCS execution" set to "1" indicates that communication through hierarchical cell structure is executed, and the "HCS execution" set to "0" indicates that communication through hierarchical cell structure is not executed (unexecuted).

The "connection as P-cell" is information indicating whether an object neighboring cell is connectable as the P-cell. In the example depicted in FIG. 15, the "connection as P-cell" with "1" indicates that the cell is connectable (available) as the P-cell and the "connection as P-cell" with "0" indicates that the cell is not connectable (unavailable) as the P-cell.

The "connection as S-cell" is information indicating whether an object neighboring cell is connectable as the S-cell. In the example depicted in FIG. 15, the "connection as S-cell" with "1" indicates that the cell is connectable (available) as the S-cell and the "connection as S-cell" with "0" indicates that the cell is not connectable (unavailable) as the S-cell.

The terminal 900 makes a cell selection based on the neighboring cell list 1500 received from the base station 800, for example. For example, if a channel connection is established in an area in which the carrier aggregation is executed and the area has the hierarchical cell structure, the terminal 900 acquires cell IDs having the "CA execution," the "HCS execution," and the "connection as P-cell" all set to "1" from the neighboring cell list 1500. In the example depicted in FIG. 15, for example, the terminal 900 acquires "Id1" and "Id3." The terminal 900 then measures the wireless channel quality for each of the cells indicated by the acquired cell IDs and selects the cell with a favorable measurement result for the P-cell.

In a system in which the carrier aggregation is always executed, the item "CA execution" may be omitted from the neighboring cell list 1500, for example. In a system always having the hierarchical cell structure, the item "HCS execution" may be omitted from the neighboring cell list 1500, for example.

FIG. 16 is a diagram of a variant example 1 of the neighboring cell list. As depicted in FIG. 16, the neighboring cell list 1500 may omit the item "connection as S-cell." In the example depicted in FIG. 16, the "description" of the neighboring cell list 1500 is also omitted.

For example, if the terminal 900 does not have to determine whether the cells are connectable as the S-cell as in the examples depicted in FIGS. 13 and 14, the item "connection as S-cell" may be omitted from the neighboring cell list 1500 as in the example depicted in FIG. 16 without any consequence.

In this case, for example, if each of the neighboring cells may be connected only as either the P-cell or the S-cell, it may be determined whether the neighboring cells are connectable as the S-cell based on the "connection as P-cell." For example, it may be determined that a neighboring cell having the "connection as P-cell" set to "1" is not connectable as the S-cell. It may be determined that a neighboring cell having the "connection as P-cell" set to "0" is connectable as the S-cell.

FIG. 17 is a diagram of a variant example 2 of the neighboring cell list. As depicted in FIG. 17, for example, an item "connection as P/S-cell" may be included instead of the item "connection as P-cell" in the neighboring cell list 1500 depicted in FIG. 16, for example. The "connection as P/S-cell" set to "1" indicates that a cell is connectable as the P-cell (available as P-cell). In this case, the cell may or may not be connectable as the S-cell. The "connection as P/S-cell" set to "0" indicates that a cell is connectable only as the S-cell (only available as S-cell).

The neighboring cell list is not limited to the neighboring cell lists 1500 depicted in FIGS. 15 to 17 and may be an neighboring cell list in forms indicating whether the neighboring cells are connectable as the P-cell or the S-cell.

As described above, according to the second embodiment, for example, by including the information indicating whether connectable as the P-cell in the neighboring cell list broadcasted by the base station 800 in the hierarchical cell structure, the terminal 900 may be prevented from making a selection error concerning the P-cell, etc.

As described above, according to the system, the base station, and the terminal, the erroneous cell selection may be prevented.

For example, conventionally, the base station notifies the terminal of the cell selection information such as the priority in the hierarchical cell structure and the offset in the cell selection. Regardless of the configuration allowing the selection of small cells using the priority or the offset, there has been a problem that a small cell cannot necessarily be selected. Particularly, in the case of communication using a large cell as the P-cell and small cells as the S-cells as depicted in FIG. 5B, a communication mode suitable for the object may not be achieved if a small cell is selected as the P-cell.

For example, a small cell may possibly have a greater reception strength in its vicinity than a remote large cell, and therefore, if the P-cell is selected simply on the basis of the magnitude of the reception strength, the large cell cannot necessarily be the P-cell. Furthermore, in the conventional method adjusting the measurement result depending on the priority, the large cell is required to have a different priority relative to the small cell in accordance with the positional relationship (near or far) between the large cell (macro base station) and the terminal. Since the configuration information such as the priority is delivered by broadcast, however, only ones having the same contents may be transmitted.

These problems will be described in detail.

A case will be described, for example, where the cell selection is made on the basis of the received power. For example, in a case of using the cell priority, the priority is expressed by a numeric value and a larger numeric value expresses a higher priority. Here, the cell selection is carried out on the basis of the product of the cell priority and the received power. In this case, if the received power is the same, a cell with a higher priority is selected.

In such a case, however, the selected cell may be different between a cell with a low priority but a high received power and a cell with a high priority but a low received power. That is, a cell with a high priority may not necessarily be selected.

Also, as described above, conventionally, the object is to achieve a preferential connection to small cells for the purpose of reducing the power consumption of the terminal and improving the frequency utilization efficiency. That is, the priority of the small cell is configured to be higher than the priority of the large cell. The offset of the small cell is configured to be greater than the offset of the large cell. Thus, a small cell may possibly be selected as the P-cell.

In a case of selecting the small cell as the P-cell and allowing the small cell to transmit only data, it becomes impossible to receive control signals after channel connection due to the random access, causing a difficulty in the channel configuration such as addition of the S-cell. Similarly, in a case of performing the cell selection using the received power and the offset, a small cell may possibly be selected as the P-cell.

These problems arise from the fact that the conventional priority and offset are premised on the hierarchical cell structure without limitation that the large cell acts as the P-cell and the small cell acts as the S-cell.

If successful in selecting the large as the P-cell, a small cell is then selected as the S-cell. Similar to the selection of the P-cell, the selection of the S-cell also uses the cell priority and offset. The conventional priority and offset are for selecting a single cell, but are not for using plural cells.

However, the priority and offset configured for selecting the P-cell are used also in selecting the S-cell. As a result, the large cell may possibly be selected as the S-cell, rendering the hierarchical cell structure meaningless.

A case will first be described where only one offset may be configured. For example, consider a case of configuring an offset to be added to the received power from the P-cell so as to preferentially select the P-cell at the time of cell selection with the macrocell as the P-cell and the picocell as the S-cell under the execution of the carrier aggregation.

Assume that this offset is configured irrespective of the execution of the carrier aggregation.

A case will be described where the carrier aggregation is executed and the macrocell (P-cell) is preferentially selected. In this case, when (distance between terminal and macrocell)>(distance between terminal and picocell) is satisfied, a received power $R_{X\ pico}$ from the picocell becomes higher than a received power $R_{X\ macro}$ from the macrocell in the environment where the transmission loss occurs depending on the distance.

For this reason, in spite of configuring the offset of the received power from the macrocell so as to select the macrocell, $R_{X\ macro}$+Offset<$R_{X\ pico}$ is established, with the result that a picocell may possibly be selected instead of the macrocell to be selected. Furthermore, also in a case of (distance between terminal and macrocell)<(distance between terminal and picocell), the picocell may possibly be selected in the same manner.

Consider a case where the above offset is configured without executing the carrier aggregation. If (distance between terminal and macrocell)>(distance between terminal and picocell) is satisfied, the macrocell is selected by adding the offset even though the received power of the macrocell is smaller than that of the picocell.

Due to the inexecution of the carrier aggregation, however, either the macrocell or the picocell may be selected for the execution of the channel configuration, without connection to both the macrocell and the picocell. Furthermore, since the received power from the picocell is higher, the wireless channel quality with the picocell is better than that with the macrocell. Therefore, the picocell should be selected.

However, since the macrocell for executing the carrier aggregation is preferentially selected, connection is made to the macrocell having a poor wireless channel quality (or a slower wireless transmission speed).

In this manner, even though the offset is configured for a certain cell, the intended cell selection may not necessarily be able to be carried out. Furthermore, if only one offset is allowed to be configured for a certain cell, the switching of whether to execute the carrier aggregation cannot be made, making flexible operation difficult.

A case will be described where only one priority may be configured. For example, consider a case of configuring the priority of the macrocell to be higher than the priority of the picocell so as to preferentially select the P-cell at the time of cell selection with the macrocell as the P-cell and the picocell as the S-cell under the execution of the carrier aggregation. Assume that this offset is configured irrespective of the execution of the carrier aggregation.

For the simplicity of explanation, a case will be described where the received power is multiplied by the priority with the priority of the macrocell being 2 and the priority of the picocell being 1. A case will first be described where the carrier aggregation is executed and the macrocell is preferentially selected.

In this case, when (distance between terminal and macrocell)>(distance between terminal and picocell) is satisfied, a received power $R_{X\ pico}$ from the picocell becomes higher than a received power $R_{X\ macro}$ from the macrocell in the environment where the transmission loss occurs depending on the distance. To cope with this, a higher priority is configured for the macrocell, than the picocell, so as to select the macrocell.

However, $R_{X\ macro} \times P_{ri\ macro} < R_{X\ pico} \times P_{ri\ pico}$ is established, with the result that a picocell may possibly be selected instead of the macrocell to be selected. $P_{ri\ macro}$ is the priority of the macrocell, while $P_{ri\ pico}$ is the priority of the picocell. For example, if the priority of the macrocell is 2 and the priority of the picocell is 1, the picocell may possibly be selected when the received power of the macrocell is less than or equal to half of the received power of the picocell.

Consider a case where the offset is configured without executing the carrier aggregation. If (distance between terminal and macrocell)>(distance between terminal and picocell) is satisfied, the macrocell is selected by the priority even though the received power of the macrocell is smaller than that of the picocell.

Due to the inexecution of the carrier aggregation, however, either the macrocell or the picocell may be selected for the execution of the channel configuration, instead of connection to both the macrocell and the picocell. Furthermore, since the received power from the picocell is higher, the wireless channel quality with the picocell is better than that with the macrocell. Therefore, the picocell should be selected.

However, since the macrocell for executing the carrier aggregation is preferentially selected, connection is made to the macrocell having a poor wireless channel quality (or a slower wireless transmission speed).

In this manner, even though the priority is configured for a certain cell, the intended cell selection may not necessarily be carried out. Furthermore, if only one priority is allowed to be configured for a certain cell, the switching of whether to execute the carrier aggregation cannot be made, making flexible operation difficult.

In the description above, the cell selection at the time of an outgoing call has been described. Meanwhile, in the cases where the terminal is in camp-on state for a certain cell without executing data reception continuously for a certain period of time or more and that waiting for the certain cell is stopped, the terminal may move to a site different from the previous cell. In these cases, update or reconfiguration of a channel is required, and cell reselection is executed for this purpose. In the cell reselection, similar to the initial cell selection, a picocell serving as the S-cell may be selected and a request for channel connection may be made to the picocell.

As described above, conventionally, there has been a problem of erroneous cell selection due to the hierarchical cell structure. In this regard, according to the embodiments described above, by including the information indicating whether each of the neighboring cells is connectable as the P-cell or the S-cell in the neighboring cell list broadcasted by the base station in the hierarchical cell structure, the terminal may be prevented from making a selection error for the P-cell and the S-cell.

Since a cell connectable as the P-cell may be identified at the terminal, the objects of measurement and calculation of wireless channel quality may be limited and the processing amount may be reduced. Additionally, since the number of objects of cell selection decreases, a selection process may be reduced. As a result, the cell selection may be performed in a shorter time and the transmission speed may be improved.

In the above embodiments, a case has been described where the carrier aggregation is carried out by two component carriers (i.e. one P-cell and one S-cell). It should be noted that a second and subsequent S-cells may be added so that the carrier aggregation may be carried out by three or more component carriers.

Although the case of applying the present invention to the LTE-Advanced system has been described, the present invention is applicable, for example, to a system communicating by concurrently using plural cells (bands) in the hierarchical cell structure. Examples of such a system include DC-HSDPA and 4C-HSDPA of the W-CDMA.

In the 3GPP, the structure where cells having different cell sizes are arranged is called a heterogeneous network (HetNet), the hierarchical cell structure is also the heterogeneous network. Thus, the present invention may be carried out for a heterogeneous network.

However, in the conventional techniques described above, cell misselection may occur such as, for example, selecting, as a primary cell, a cell not supporting connection or waiting at the primary cell.

In contrast, one aspect of the present invention produces an effect of preventing erroneous cell selection.

Another aspect produces an effect of enabling connection to a proper cell.

A further aspect produces an effect of enabling connection to a proper cell among cells different in type.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
    a terminal configured to perform wireless communication concurrently using a cell of a first type enabling wireless communication without being associated with another cell and a cell of a second type enabling wireless communication by being associated with the cell of the first type; and
    a base station configured to form a first cell and transmit broadcast information, the broadcast information including identification information of a second cell different from the first cell and information indicating whether the second cell is communicable as a cell of the first type,
    wherein the terminal selects the second cell as the cell of the first type based on the broadcast information, and
    wherein the cell of the first type comprises a cell configured to be independently connectable to the terminal without association with another cell, and the cell of the second type comprises a cell configured to be connected to the terminal with association with the cell of the first type but is not independently connectable to the terminal.

2. The wireless communication system according to claim 1, wherein
    the second cell is one of a plurality of second cells formed by one or more base stations, and
    the terminal identifies the plurality of second cells based on the broadcast information and selects the cell of the first type from among the plurality of second cells, based on wireless channel qualities of the plurality of second cells.

3. The wireless communication system according to claim 1, wherein the broadcast information further includes identification information of a third cell and information indicating whether the third cell is communicable as a cell of the second type.

4. The wireless communication system according to claim 3, wherein
    the third cell is one of a plurality of third cells formed by one or more base stations, and
    the base station requests the terminal to measure the wireless channel qualities of the plurality of third cells and gives notification of at least one third cell to be the third cell to which the terminal connects among the plurality of third cells.

5. The wireless communication system according to claim 3, wherein
    the third cell is one of a plurality of third cells formed by one or more base stations, and
    the terminal identifies the plurality of the third cells based on the broadcast information and selects the cell of the second type from among the plurality of third cells, based on the wireless channel qualities of the plurality of third cells.

6. The wireless communication system according to claim 1, wherein the wireless communication is wireless communication concurrently using a cell of the first type and a cell of the second type at least partially included in the cell of the first type.

7. The wireless communication system according to claim 1, wherein the wireless communication implements carrier aggregation, the cell of the first type is a primary cell, and the cell of the second type is a secondary cell.

8. The wireless communication system according to claim 1, wherein the base station forms the second cell.

9. A base station comprising:
    a controller configured to form a first cell in a system having a terminal configured to perform wireless communication concurrently using a cell of a first type enabling wireless communication without being associated with another cell and a cell of a second type enabling wireless communication by being associated with the cell of the first type; and
    a generator configured to generate broadcast information including identification information of a second cell different from the first cell and information indicating whether the second cell is communicable as a cell of the first type; and
    a transmitter configured to transmit the broadcast information,
    wherein the cell of the first type comprises a cell configured to be independently connectable to the terminal without association with another cell, and the cell of the second type comprises a cell configured to be connected to the terminal with association with the cell of the first type but is not independently connectable to the terminal.

10. A terminal comprising:
    a controller configured to perform wireless communication concurrently using a cell of a first type enabling wireless communication without being associated with another cell and a cell of a second type enabling wireless communication by being associated with the cell of the first type;
    a receiver configured to receive broadcast information from a first cell, the broadcast information including identification information of a second cell different from the first cell and information indicating whether the second cell is communicable as a cell of the first type; and a selector configured to select the second cell as the cell of the first type, based on the broadcast information, wherein the cell of the first type comprises a cell configured to be independently connectable to the terminal without association with another cell, and the cell of the second type comprises a cell configured to be connected to the terminal with association with the cell of the first type but is not independently connectable to the terminal.

11. A wireless communication system comprising:

a terminal configured to perform wireless communication concurrently using a cell of a first type enabling wireless communication without being associated with another cell and a cell of a second type enabling wireless communication by being associated with the cell of the first type; and a base station configured to form a first cell and transmit broadcast information including identification information of a second cell different from the first cell and information indicating whether the second cell is communicable as a cell of the second type, wherein the terminal selects the second cell as the cell of the second type based on the broadcast information, and wherein the cell of the first type comprises a cell configured to be independently connectable to the terminal without association with another cell, and the cell of the second type comprises a cell configured to be connected to the terminal with association with the cell of the first type but is not independently connectable to the terminal.

12. A base station comprising:

a controller configured to form a first cell in a system having a terminal configured to perform wireless communication concurrently using a cell of a first type enabling wireless communication without being associated with another cell and a cell of a second type enabling wireless communication by being associated with the cell of the first type;

a generator configured to generate broadcast information including identification information of a second cell different from the first cell and information indicating whether the second cell is communicable as a cell of the second type; and a transmitter configured to transmit the generated broadcast information through the first cell, wherein the cell of the first type comprises a cell configured to be independently connectable to the terminal without association with another cell, and the cell of the second type comprises a cell configured to be connected to the terminal with association with the cell of the first type but is not independently connectable to the terminal.

13. A terminal comprising:

a controller configured to perform wireless communication concurrently using a cell of a first type enabling wireless communication without being associated with another cell and a cell of a second type enabling wireless communication by being associated with the cell of the first type;

a receiver configured to receive broadcast information from a first cell, broadcast information including identification information of a second cell and information indicating whether the second cell is communicable as the cell of the second type; and a selector configured to select the second cell as the cell of the second type, based on the broadcast information, wherein the cell of the first type comprises a cell configured to be independently connectable to the terminal without association with another cell, and the cell of the second type comprises a cell configured to be connected to the terminal with association with the cell of the first type but is not independently connectable to the terminal.

* * * * *